United States Patent
Yasuda et al.

(10) Patent No.: US 9,401,875 B2
(45) Date of Patent: Jul. 26, 2016

(54) PACKET TRANSFER PROCESSING METHOD AND PACKET TRANSFER PROCESSING DEVICE

(71) Applicant: NIPPON TELEGRAPH AND TELEPHONE CORPORATION, Tokyo (JP)

(72) Inventors: Sadayuki Yasuda, Tokyo (JP); Masami Urano, Tokyo (JP); Tsugumichi Shibata, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 55 days.

(21) Appl. No.: 14/402,683
(22) PCT Filed: May 31, 2013
(86) PCT No.: PCT/JP2013/065267
§ 371 (c)(1),
(2) Date: Nov. 20, 2014
(87) PCT Pub. No.: WO2013/180295
PCT Pub. Date: Dec. 5, 2013

(65) Prior Publication Data
US 2015/0146740 A1 May 28, 2015

(30) Foreign Application Priority Data
Jun. 1, 2012 (JP) ................................ 2012-126397

(51) Int. Cl.
*H04L 12/935* (2013.01)
*H04L 12/741* (2013.01)
*H04L 12/931* (2013.01)
*H04L 12/701* (2013.01)

(52) U.S. Cl.
CPC ............... *H04L 49/30* (2013.01); *H04L 45/74* (2013.01); *H04L 49/00* (2013.01); *H04L 45/00* (2013.01)

(58) Field of Classification Search
None
See application file for complete search history.

(56) References Cited

U.S. PATENT DOCUMENTS

| | | | | |
|---|---|---|---|---|
| 8,095,816 B1* | 1/2012 | Chan | ..................... | G06F 1/3209 710/56 |
| 2003/0074388 A1* | 4/2003 | Pham | ..................... | H04L 49/254 718/106 |
| 2003/0226046 A1* | 12/2003 | John | ..................... | G06F 1/3202 713/300 |

FOREIGN PATENT DOCUMENTS

| JP | 2008-301145 A | 12/2008 |
|---|---|---|
| JP | 2011-233992 A | 11/2011 |

OTHER PUBLICATIONS

Ishida, et al., "10 Gbit Ethernet Textbook", *Impress R&D*, (2005), p. 76.

*Primary Examiner* — Faruk Hamza
*Assistant Examiner* — Cassandra L Decker
(74) *Attorney, Agent, or Firm* — Blakely Sokoloff Taylor & Zafman LLP

(57) ABSTRACT

A packet transfer processing device includes common processing units that perform processing common to inbound processing of a packet received from an access network for transfer to a core network and outbound processing of a packet received from the core network for transfer to the access network, an input destination switching unit that selects common processing units to which the received packets are to be input, an output destination switching unit that outputs packets processed by the common processing units to a destination network, an individual processing switching unit that selects a common processing unit to connect to an individual processing unit that performs individual processing not performed by the common processing units as part of inbound processing, and a control unit that controls the input destination switching unit, the individual processing switching unit, and switching supply/shutoff of power to the common processing units.

16 Claims, 19 Drawing Sheets

PACKET TRANSFER PROCESSING METHOD AND PACKET TRANSFER PROCESSING DEVICE

TECHNICAL FIELD

The present invention relates to a packet transfer processing method and a packet transfer processing device which control a packet transfer destination in a router or a switch that concentrates an access network in a communication network and is connected to a core network.

BACKGROUND ART

A router/switch performs inbound processing that receives a packet from the side of an access network to which a user device is connected, and outbound processing that transmits a packet to the side of the access network (concentrates the access network and assumes a position to connect a core network). A packet transfer processing device generates transfer destination information based on the header information of a received packet and route information acquired in advance and transmits a packet having a header including the transfer destination information. Such a packet transfer processing device conventionally includes a dedicated inbound processing unit and a dedicated outbound processing unit and implements both processes.

FIG. 19 is a block diagram showing an example of the arrangement of a conventional general packet transfer processing device. A packet transfer processing device 100 includes a dedicated inbound processing unit 101 and a dedicated outbound processing unit 102. Referring to FIG. 19, reference numeral 103 denotes a reception terminal that receives a packet from an access network; 104, a reception terminal that receives a packet from a core network; 105, a transmission terminal that transmits a packet to the core network; and 106, a transmission terminal that transmits a packet to the access network. Such a packet transfer processing device is disclosed in, for example, literature "Osamu Ishida, Koichiro Seto, "10 Gbit Ethernet® Textbook", Impress R&D, p. 76, 2005".

Inbound processing that receives a packet from the access network and transmits it to the core network is performed by the dedicated inbound processing unit 101, and outbound processing that receives a packet from the core network and transmits it to the access network is performed by the dedicated outbound processing unit 102. Hence, the two dedicated processing units need to be operated always even when the amount of packets (traffic volume) to be processed is small. For this reason, the packet transfer processing device 100 always consumes power for the two dedicated processing units even if the performance has a margin for the processing amount.

DISCLOSURE OF INVENTION

Problem to be Solved by the Invention

As described above, the conventional packet transfer processing device needs to operate the two dedicated processing units for inbound processing and outbound processing even when the amount of packets (traffic volume) to be processed is small. For this reason, power for the two dedicated processing units is always consumed even if the performance has a margin for the processing amount.

The present invention has been made to solve the above-described problem, and has as its object to provide a packet transfer processing method and a packet transfer processing device capable of reducing power consumption as compared to before.

Means of Solution to the Problem

According to the present invention, there is provided a packet transfer processing method comprising the input destination switching step of selecting one of a plurality of common processing units that perform processing sharable in first transfer processing that receives a packet from a first network and transfers the packet to a second network and second transfer processing that receives a packet from the second network and transfers the packet to the first network, to which the packets received from the first network and the second network are to be input, the common processing step of causing the plurality of common processing units to perform the processing sharable in the first transfer processing and the second transfer processing, the output destination switching step of outputting the packet processed in the common processing step to a network of a transfer destination, the individual processing switching step of selecting which common processing unit is to be connected to an individual processing unit that performs at least one of first individual processing nonsharable by the common processing units out of the first transfer processing and second individual processing nonsharable by the common processing units out of the second transfer processing, and the control step of performing selection control in the input destination switching step, selection control in the individual processing switching step, and control of switching supply/shutoff of power to the common processing units.

According to the present invention, there is also provided a packet transfer processing device comprising a plurality of common processing units that perform processing sharable in first transfer processing that receives a packet from a first network and transfers the packet to a second network and second transfer processing that receives a packet from the second network and transfers the packet to the first network, an input destination switching unit that selects a common processing unit to which the packets received from the first network and the second network are to be input, an output destination switching unit that outputs the packet processed by the common processing unit to a network of a transfer destination, an individual processing switching unit that selects which common processing unit is to be connected to an individual processing unit that performs at least one of first individual processing nonsharable by the common processing units out of the first transfer processing and second individual processing nonsharable by the common processing units out of the second transfer processing, and a control unit that performs control of the input destination switching unit, control of the individual processing switching unit, and control of switching supply/shutoff of power to the common processing units.

Effect of the Invention

According to the present invention, it is possible to produce an excellent effect of reducing power consumption by, at an operation point where the traffic volume of received packets is low, shutting off power supply to the first common processing unit while continuing the packet transfer processing function of transferring a packet received from the first network to the second network and transferring a packet received from the second network to the first network.

BEST MODE FOR CARRYING OUT THE INVENTION

[Principle of Invention]

In packet transfer processing, several functions such as write/read of a received packet in/from an accumulation buffer, header analysis, management information generation at the time of reception, search key information extraction and search key information transmission to a search engine, transmission management information generation, and header generation have common processing contents in inbound processing and outbound processing. However, information stored in a table for a search in inbound processing and information stored in a table for a search in outbound processing are normally different. Hence, for example, search processing to these tables needs to be individually performed for inbound and outbound. As for the common functions, a common processing unit is configured to perform both or one of inbound processing and outbound processing. When the traffic volume is low, and processing can be done by one common processing unit, the common processing unit is caused to perform both inbound processing and outbound processing. When the traffic volume is high, and processing cannot be done by one common processing unit, the common processing unit is caused to perform only outbound processing. Inbound processing is performed by another dedicated processing unit prepared for load distribution, thereby enabling processing of the same traffic volume as before. When processing can be done by one common processing unit, power to the dedicated processing unit that is not used is shut off, thereby reducing power consumption in accordance with the load.

First Embodiment

Figure 1:
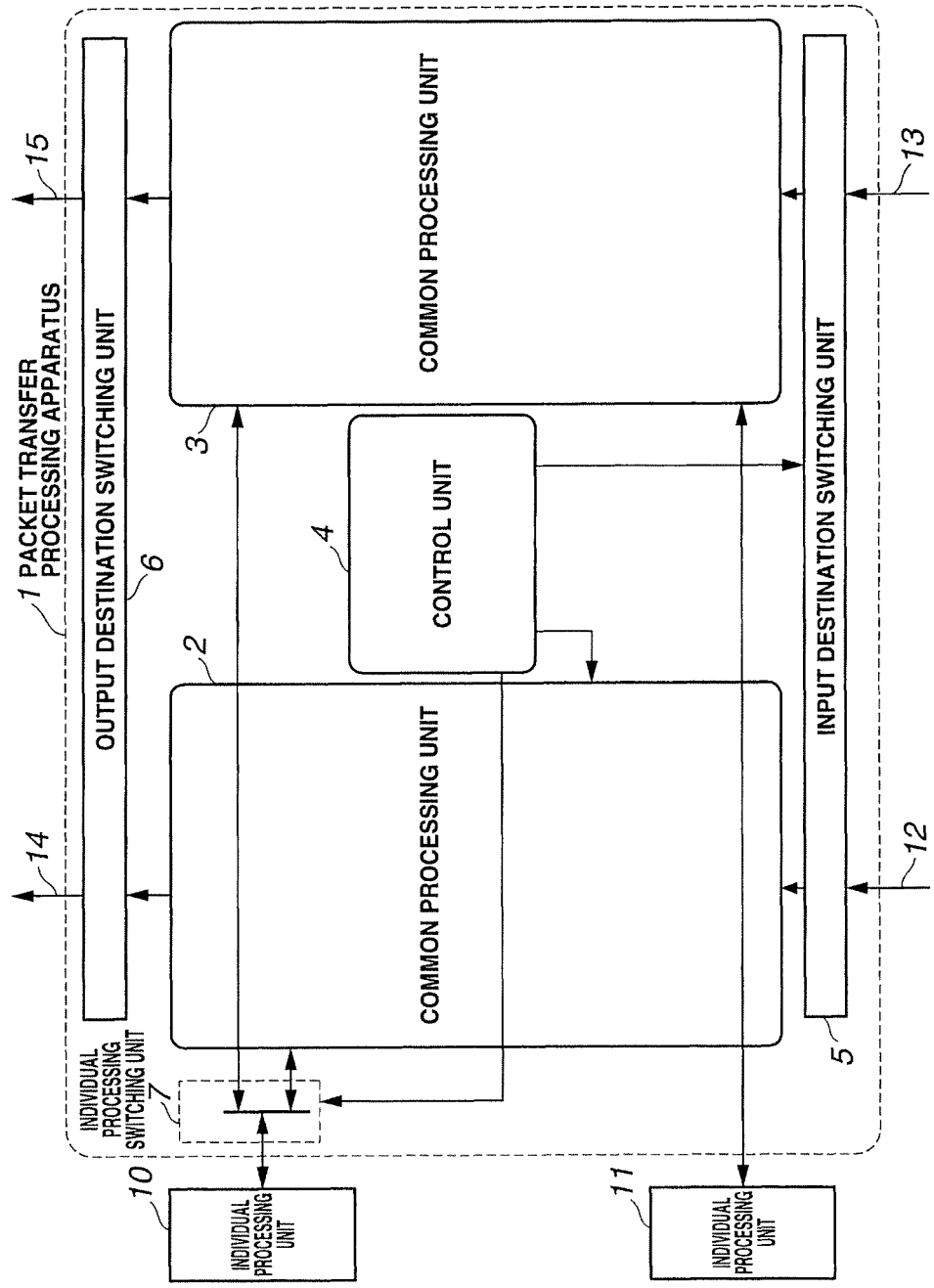
FIG. 1 is a block diagram showing the arrangement of a packet transfer processing device according to the first embodiment of the present invention.

An embodiment of the present invention will now be described with reference to the accompanying drawings. FIG. 1 is a block diagram showing the arrangement of a packet transfer processing device according to the first embodiment of the present invention.

A packet transfer processing device 1 according to this embodiment includes a common processing unit 2 (first common processing unit), a common processing unit 3 (second common processing unit), a control unit 4, an input destination switching unit 5, an output destination switching unit 6, and an individual processing switching unit 7.

Referring to FIG. 1, reference numeral 10 denotes an individual processing unit; 11, an individual processing unit; 12, a reception terminal that receives a packet from, for example, an access network (first network); 13, a reception terminal that receives a packet from, for example, a core network (second network); 14, a transmission terminal that transmits a packet to, for example, the core network; and 15, a transmission terminal that transmits a packet to, for example, the access network.

The packet transfer processing device 1 performs processing of generating transfer destination information based on the header information of a received packet and route information acquired in advance, adding header information including the transfer destination information to a packet, and transmitting it. The common processing units 2 and 3 respectively perform processes sharable in inbound processing (first transfer processing) that receives a packet from the access network and transmits it to the core network and outbound processing (second transfer processing) that receives a packet from the core network and transmits it to the access network.

The individual processing unit 10 is a means for performing individual processing necessary in inbound processing out of processes nonsharable in inbound processing and outbound processing. The individual processing unit 11 is a means for performing individual processing necessary in outbound processing out of processes nonsharable in inbound processing and outbound processing.

Figure 2:
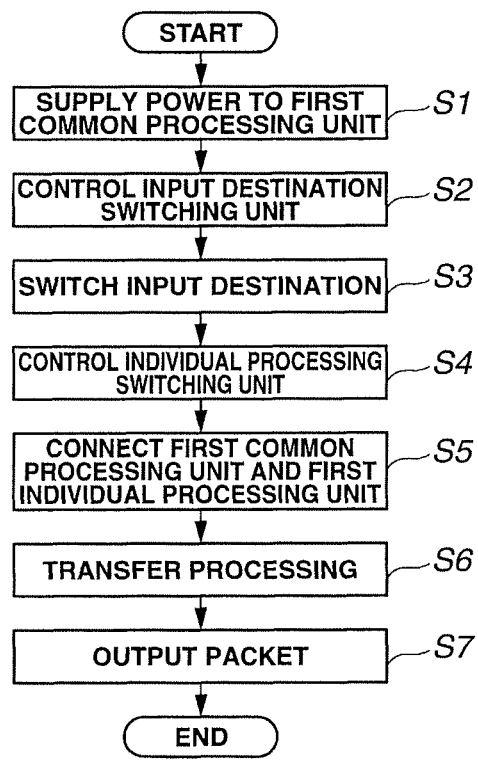
FIG. 2 is a flowchart showing the operation of the packet transfer processing device according to the first embodiment of the present invention.

FIG. 2 is a flowchart showing the operation of the packet transfer processing device 1 in the normal state. In the normal state, the control unit 4 of the packet transfer processing device 1 turns on the power supply function and supplies power to the common processing unit 2 (step S1 of FIG. 2), and also controls the input destination switching unit 5 such that a packet received by the reception terminal 12 is input to the common processing unit 2, and a packet received by the reception terminal 13 is input to the common processing unit 3 (steps S2 and S3 of FIG. 2). In the normal state, the control unit 4 also controls the individual processing switching unit 7 such that the common processing unit 2 and the external individual processing unit 10 cooperatively perform transfer processing of the packet received by the reception terminal 12 and input from the input destination switching unit 5 to the common processing unit 2 (step S4 of FIG. 2). With this control, the common processing unit 2 and the individual processing unit 10 are connected (step S5 of FIG. 2).

The common processing unit 2 performs transfer processing of the packet received by the reception terminal 12 and input from the input destination switching unit 5 to the common processing unit 2 in cooperation with the external individual processing unit 10 (step S6 of FIG. 2). In the normal state, the common processing unit 3 performs transfer processing of a packet received by the reception terminal 13 and input from the input destination switching unit 5 to the common processing unit 3 in cooperation with the external individual processing unit 11 (step S6).

The output destination switching unit 6 outputs, out of packets output from the common processing units 2 and 3, the packet received by the reception terminal 12 to the transmission terminal 14 and the packet received by the reception terminal 13 to the transmission terminal 15 (step S7 of FIG. 2). Note that a discrimination between the packet received by the reception terminal 12 and that received by the reception terminal 13 can be made based on the header information of the packets. The components other than the output destination switching unit 6 also make the discrimination of packets by referring to the header information of the packets when necessary.

With the above arrangement, in the normal state, the packet received by the reception terminal 12 is input to the common processing unit 2 via the input destination switching unit 5. The individual processing switching unit 7 connects the common processing unit 2 and the individual processing unit 10. The common processing unit 2 performs the packet transfer processing in cooperation with the external individual processing unit 10 via the individual processing switching unit 7. The packet processed by the common processing unit 2 is transmitted from the transmission terminal 14 via the output destination switching unit 6. The packet received by the reception terminal 13 is input to the common processing unit 3 via the input destination switching unit 5. The common processing unit 3 performs the packet transfer processing in cooperation with the external individual processing unit 11. The packet processed by the common processing unit 3 is transmitted from the transmission terminal 15 via the output destination switching unit 6.

An operation performed when the traffic volume of packets to be received is low, more specifically, when it is known in advance that the total sum of the amount of packets to be received by the reception terminal 12 and the amount of packets to be received by the reception terminal 13 is an amount processable by one common processing unit will be described next with reference to FIG. 3.

Figure 3:
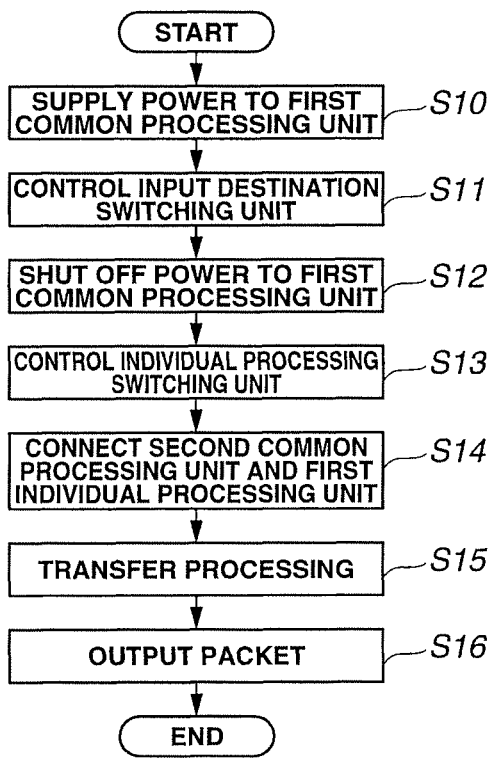
FIG. 3 is a flowchart showing the operation of the packet transfer processing device according to the first embodiment of the present invention.

When it is known in advance that the traffic volume of packets to be received is low, the control unit 4 controls the input destination switching unit 5 such that a packet received by the reception terminal 12 is input to the common processing unit 3, and a packet received by the reception terminal 13 is also input to the common processing unit 3 (steps S10 and S11 of FIG. 3).

When it is known in advance that the traffic volume of packets to be received is low, the control unit 4 controls the individual processing switching unit 7 such that the common processing unit 3 and the external individual processing unit 10 cooperatively perform transfer processing of the packet received by the reception terminal 12 and input from the input destination switching unit 5 to the common processing unit 3 (step S13 of FIG. 3). With this control, the common processing unit 3 and the individual processing unit 10 are connected (step S14 of FIG. 3). The common processing unit 3 performs transfer processing of the packet received by the reception terminal 12 and input from the input destination switching unit 5 to the common processing unit 3 in cooperation with the individual processing unit 10 (step S15 of FIG. 3).

The common processing unit 3 also performs transfer processing of the packet received by the reception terminal 13 and input from the input destination switching unit 5 to the common processing unit 3 in cooperation with the external individual processing unit 11 (step S15).

The output destination switching unit 6 outputs, out of the packets output from the common processing unit 3, the packet received by the reception terminal 12 to the transmission terminal 14 and the packet received by the reception terminal 13 to the transmission terminal 15 (step S16 of FIG. 3)

With the above arrangement, when it is known in advance that the traffic volume of packets to be received is low, both the packet received by the reception terminal 12 and the packet received by the reception terminal 13 are input to the common processing unit 3 via the input destination switching unit 5. The common processing unit 3 performs transfer processing of the packet received by the reception terminal 12 in cooperation with the external individual processing unit 10 via the individual processing switching unit 7, and performs transfer processing of the packet received by the reception terminal 13 in cooperation with the external individual processing unit 11. The output destination switching unit 6 that has received the packets processed by the common processing unit 3 outputs the packet received by the reception terminal 12 to the transmission terminal 14 and outputs the packet received by the reception terminal 13 to the transmission terminal 15.

When it is known in advance that the traffic volume of packets to be received is low, the control unit 4 turns off the power supply function and shuts off power supply to the common processing unit 2 because no packets are input to the common processing unit 2, and the common processing unit 2 does not perform transfer processing (Step S12 of FIG. 3).

As described above, in this embodiment, when the total sum of the amount of packets to be received by the reception terminal 12 and the amount of packets to be received by the reception terminal 13 is an amount processable by one common processing unit, the power consumption of the common processing unit 2 can be reduced, and consequently, the power consumption of the packet transfer processing device 1 can be reduced.

Second Embodiment

Figure 4:
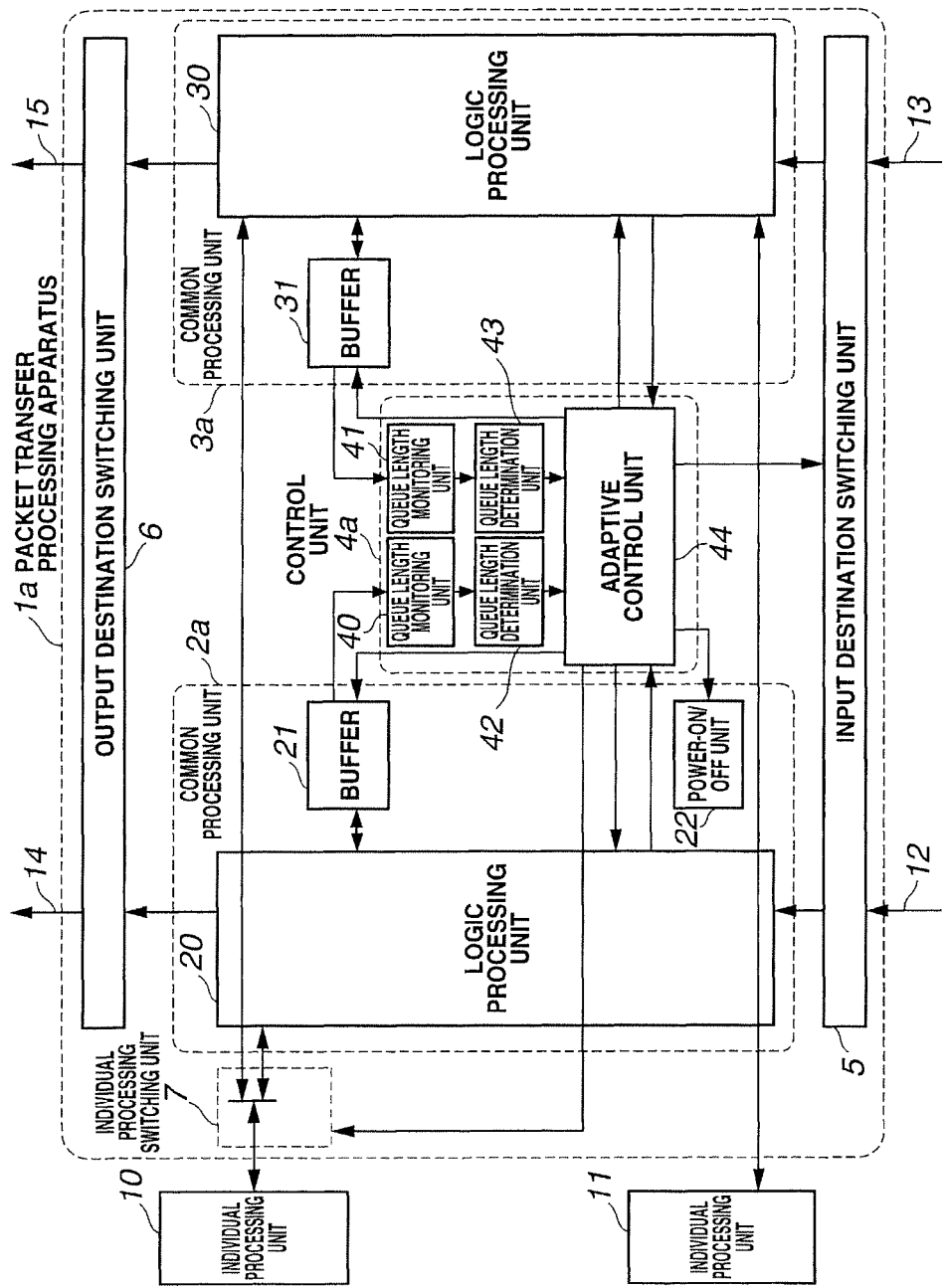
FIG. 4 is a block diagram showing the arrangement of a packet transfer processing device according to the second embodiment of the present invention.

The second embodiment of the present invention will be described next. FIG. 4 is a block diagram showing the arrangement of a packet transfer processing device according to the second embodiment of the present invention.

A packet transfer processing device 1a according to this embodiment includes a common processing unit 2a (first common processing unit), a common processing unit 3a (second common processing unit), a control unit 4a, an input destination switching unit 5, an output destination switching unit 6, and an individual processing switching unit 7.

The common processing unit 2a includes a logic processing unit 20 (first logic processing unit), a buffer 21 (first buffer), and a power-on/off unit 22.

The common processing unit 3a includes a logic processing unit 30 (second logic processing unit) and a buffer 31 (second buffer).

The control unit 4a includes a queue length monitoring unit 40 (first queue length monitoring unit), a queue length monitoring unit 41 (second queue length monitoring unit), a queue length determination unit 42 (first queue length determination unit), a queue length determination unit 43 (second queue length determination unit), and an adaptive control unit 44.

In the first embodiment, when the total sum of the amount of packets to be received is an amount processable by one common processing unit, the power consumption of the packet transfer processing device 1 can be reduced. This embodiment is different from the first embodiment in that even at an application point where the total sum of the amount of packets to be received may exceed the amount processable by one common processing unit, power consumption can be reduced if the traffic volume is processable by one common processing unit.

The operation of the packet transfer processing device 1a according to this embodiment will be described next with reference to FIG. 5. At the time of initialization (step S100 of FIG. 5), a packet received by a reception terminal 12 is input to the common processing unit 2a via the input destination switching unit 5. The individual processing switching unit 7 connects the common processing unit 2a and an individual processing unit 10. The common processing unit 2a performs the packet transfer processing in cooperation with the external individual processing unit 10 via the individual processing switching unit 7. The packet processed by the common processing unit 2a is transmitted from a transmission terminal 14 via the output destination switching unit 6.

At the time of initialization, a packet received by a reception terminal 13 is input to the common processing unit 3a via the input destination switching unit 5. The common processing unit 3a performs the packet transfer processing in cooperation with an external individual processing unit 11. The packet processed by the common processing unit 3a is transmitted from a transmission terminal 15 via the output destination switching unit 6.

The logic processing unit 20 in the common processing unit 2a temporarily accumulates, in the buffer 21, the packet input from the input destination switching unit 5, performs necessary processing for the packet in cooperation with the individual processing unit 10, and after that, reads out the packet from the buffer 21 and outputs it to the output destination switching unit 6. Similarly, the logic processing unit 30 in the common processing unit 3a temporarily accumulates, in the buffer 31, the packet input from the input destination switching unit 5, performs necessary processing for the packet in cooperation with the individual processing unit 11, and after that, reads out the packet from the buffer 31 and outputs it to the output destination switching unit 6.

The queue length monitoring unit 40 in the control unit 4a monitors the accumulation amount of the buffer 21. Similarly, the queue length monitoring unit 41 in the control unit 4a monitors the accumulation amount of the buffer 31.

When the queue length determination unit 42 determines that the accumulation amount of the buffer 21 is larger than a predetermined first threshold, the adaptive control unit 44 in the control unit 4a turns on the power supply function and supplies power to the common processing unit 2a, and also controls the input destination switching unit 5 such that the packet received by the reception terminal 12 is input to the common processing unit 2a, and the packet received by the reception terminal 13 is input to the common processing unit 3a.

When the queue length determination unit 42 determines that the accumulation amount of the buffer 21 is larger than the first threshold, the adaptive control unit 44 controls the individual processing switching unit 7 such that the common processing unit 2a and the external individual processing unit 10 cooperatively perform transfer processing of the packet received by the reception terminal 12 and input from the input destination switching unit 5 to the common processing unit 2a.

When the queue length determination unit 42 determines that the accumulation amount of the buffer 21 is larger than the first threshold, the adaptive control unit 44 permits the buffer 21 to output the packet received by the reception terminal 12, permits the buffer 31 to output the packet received by the reception terminal 13, prohibits the buffer 21 from outputting the packet received by the reception terminal 13, and prohibits the buffer 31 from outputting the packet received by the reception terminal 12. In addition, the adaptive control unit 44 prohibits the common processing unit 3a from performing transfer processing of the packet received by the reception terminal 12.

The output destination switching unit 6 outputs, out of packets output from the common processing units 2a and 3a, the packet received by the reception terminal 12 and processed by the common processing unit 2a to the transmission terminal 14 and the packet received by the reception terminal 13 and processed by the common processing unit 3a to the transmission terminal 15.

In this way, when the accumulation amount of the buffer 21 is larger than the first threshold, the operation at the time of initialization continues.

When the traffic volume of packets received by the reception terminal 12 decreases, and the queue length determination unit 42 determines that the accumulation amount of the buffer 21 is equal to or smaller than the first threshold (YES in step S101 of FIG. 5), the adaptive control unit 44 operates as follows depending on whether the accumulation amount of the buffer 31 monitored by the queue length monitoring unit 41, that is, the total sum of the accumulation amount of packets received by the reception terminal 12 in the buffer 31 and the accumulation amount of packets received by the reception terminal 13 in the buffer 31 is determined to be smaller or larger than a predetermined second threshold.

When the queue length determination unit 43 determines that the accumulation amount of the buffer 31 is larger than the predetermined second threshold (NO in step S102 of FIG. 5), the control of the adaptive control unit 44 does not change, and the adaptive control unit 44 continues the current operation.

Figure 5:
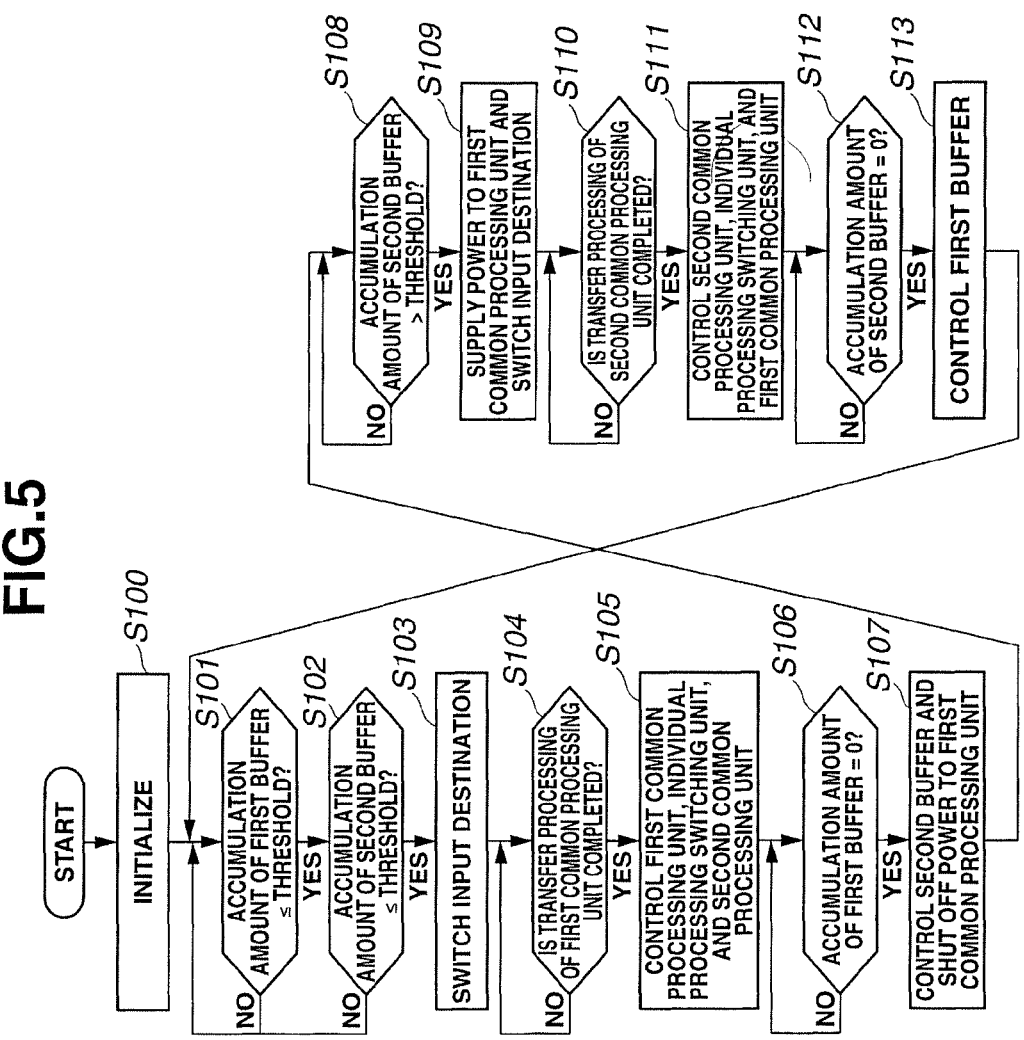
FIG. 5 is a flowchart showing the operation of the packet transfer processing device according to the second embodiment of the present invention.

On the other hand, when the queue length determination unit 42 determines that the accumulation amount of the buffer 21 is equal to or smaller than the first threshold (YES in step S101 of FIG. 5), and the queue length determination unit 43 determines that the accumulation amount of the buffer 31 is equal to or smaller than the second threshold (YES in step S102 of FIG. 5), the adaptive control unit 44 controls the input destination switching unit 5 to change the packet input destination such that the packet received by the reception terminal 12 is input to the common processing unit 3$a$, and the packet received by the reception terminal 13 is also input to the common processing unit 3$a$ (step S103 of FIG. 5). However, the adaptive control unit 44 continues control of output prohibition at the time of initialization such that the buffer 31 does not output the packet received by the reception terminal 12.

When the packet input destination is switched, any packet received by the reception terminal 12 is not newly input to the common processing unit 2$a$. For this reason, transfer processing of packets received by the reception terminal 12 and accumulated in the buffer 21 is completed after a while. When transfer processing of the packets received by the reception terminal 12 is completed, the logic processing unit 20 in the common processing unit 2$a$ notifies the adaptive control unit 44 of the completion of transfer processing.

Upon receiving the transfer processing completion notification from the logic processing unit 20 (YES in step S104 of FIG. 5), the adaptive control unit 44 prohibits the common processing unit 2$a$ from performing transfer processing of the packet received by the reception terminal 12 (step S105 of FIG. 5). When the adaptive control unit 44 receives the transfer processing completion notification, the common processing unit 2$a$ has already completed transfer processing performed in cooperation with the external individual processing unit 10. Hence, the individual processing unit 10 can be disconnected from the common processing unit 2$a$ without any problem. The adaptive control unit 44 controls the individual processing switching unit 7 such that the common processing unit 3$a$ and the external individual processing unit 10 cooperatively perform transfer processing of the packet received by the reception terminal 12 and input from the input destination switching unit 5 to the common processing unit 3$a$ (step S105).

Next, the adaptive control unit 44 permits the common processing unit 3$a$ to perform transfer processing of the packet received by the reception terminal 12 (step S105). According to this permission, the logic processing unit 30 in the common processing unit 3$a$ performs transfer processing of the packet received by the reception terminal 12 and accumulated in the buffer 31 in cooperation with the individual processing unit 10. Additionally, the logic processing unit 30 performs transfer processing of the packet received by the reception terminal 13 and accumulated in the buffer 31 in cooperation with the individual processing unit 11, like at the time of initialization.

When the queue length determination unit 42 determines that the accumulation amount of the buffer 21 is zero (YES in step S106 of FIG. 5), the adaptive control unit 44 permits the buffer 31 to output the packet received by the reception terminal 12 (step S107 of FIG. 5). The output destination switching unit 6 outputs, out of the packets output from the common processing unit 3$a$, the packet received by the reception terminal 12 to the transmission terminal 14 and the packet received by the reception terminal 13 to the transmission terminal 15.

Upon determining that the accumulation amount of the buffer 21 is zero, the adaptive control unit 44 controls the power-on/off unit 22 in the common processing unit 2$a$ to turn off the power supply function and shut off power supply to the common processing unit 2$a$ (step S107).

When the queue length determination unit 43 determines that the accumulation amount of the buffer 31, that is, the total sum of the amount of packets received by the reception terminal 12 in the buffer 31 and the amount of packets received by the reception terminal 13 in the buffer 31 is larger than the predetermined second threshold (YES in step S108 of FIG. 5), the adaptive control unit 44 controls the power-on/off unit 22 to turn on the power supply function and supply power to the common processing unit 2$a$ (step S109 of FIG. 5).

As in the preceding control, the adaptive control unit 44 prohibits the common processing unit 2$a$ from performing transfer processing of the packet received by the reception terminal 12. The adaptive control unit 44 controls output prohibition such that the buffer 21 does not output the packet, and also controls the input destination switching unit 5 to change the packet input destination such that the packet received by the reception terminal 12 is input to the common processing unit 2$a$, and the packet received by the reception terminal 13 is input to the common processing unit 3$a$ (step S109 of FIG. 5).

When the packet input destination is switched, any packet received by the reception terminal 12 is not newly input to the common processing unit 3$a$. For this reason, transfer processing of packets received by the reception terminal 12 and accumulated in the buffer 31 is completed after a while. When transfer processing of the packets received by the reception terminal 12 is completed, the logic processing unit 30 in the common processing unit 3$a$ notifies the adaptive control unit 44 of the completion of transfer processing.

Upon receiving the transfer processing completion notification from the logic processing unit 30 (YES in step S110 of FIG. 5), the adaptive control unit 44 prohibits the common processing unit 3$a$ from performing transfer processing of the packet received by the reception terminal 12 (step S111 of FIG. 5). When the adaptive control unit 44 receives the transfer processing completion notification, the common processing unit 3$a$ has already completed transfer processing performed in cooperation with the external individual processing unit 10. Hence, the individual processing unit 10 can be disconnected from the common processing unit 3$a$ without any problem. The adaptive control unit 44 controls the individual processing switching unit 7 such that the common processing unit 2$a$ and the external individual processing unit 10 cooperatively perform transfer processing of the packet received by the reception terminal 12 and input from the input destination switching unit 5 to the common processing unit 2$a$ (step S111).

Next, the adaptive control unit 44 permits the common processing unit 2$a$ to perform transfer processing of the packet received by the reception terminal 12 (step S111). According to this permission, the logic processing unit 20 in the common processing unit 2$a$ performs transfer processing of the packet received by the reception terminal 12 and accumulated in the buffer 21 in cooperation with the individual processing unit 10.

When the queue length determination unit 43 determines that, out of the accumulation amount of the buffer 31, the accumulation amount of packets received by the reception terminal 12 in the buffer 31 is zero (YES in step S112 of FIG. 5), the adaptive control unit 44 permits the buffer 21 to output the packet received by the reception terminal 12 (step S113 of FIG. 5). The adaptive control unit 44 then returns to step S101.

The packet transfer processing device 1$a$ thus returns to the state at the time of initialization. More specifically, the common processing unit 2$a$ performs the packet transfer processing in cooperation with the external individual processing unit 10 via the individual processing switching unit 7. The packet processed by the common processing unit 2$a$ is transmitted from the transmission terminal 14 via the output destination switching unit 6. The packet received by the reception terminal 13 is input to the common processing unit 3$a$ via the input destination switching unit 5. The common processing unit 3a performs the packet transfer processing in cooperation with the external individual processing unit 11. The packet processed by the common processing unit 3a is transmitted from the transmission terminal 15 via the output destination switching unit 6. The adaptive control unit 44 controls such that the buffer 31 does not output the packet received by the reception terminal 12.

According to the above-described procedure, even when control is performed to cause only one common processing unit 3a to perform the packet transfer processing, shut off power to the other common processing unit 2a, and resume power supply and return to processing by both the common processing units 2a and 3a, packet loss or order change does not occur. In this embodiment, when the total sum of the amounts of received packets decreases to an amount processable by one common processing unit 3a, the power consumption of the packet transfer processing device 1a can be reduced.

Third Embodiment

Figure 6:
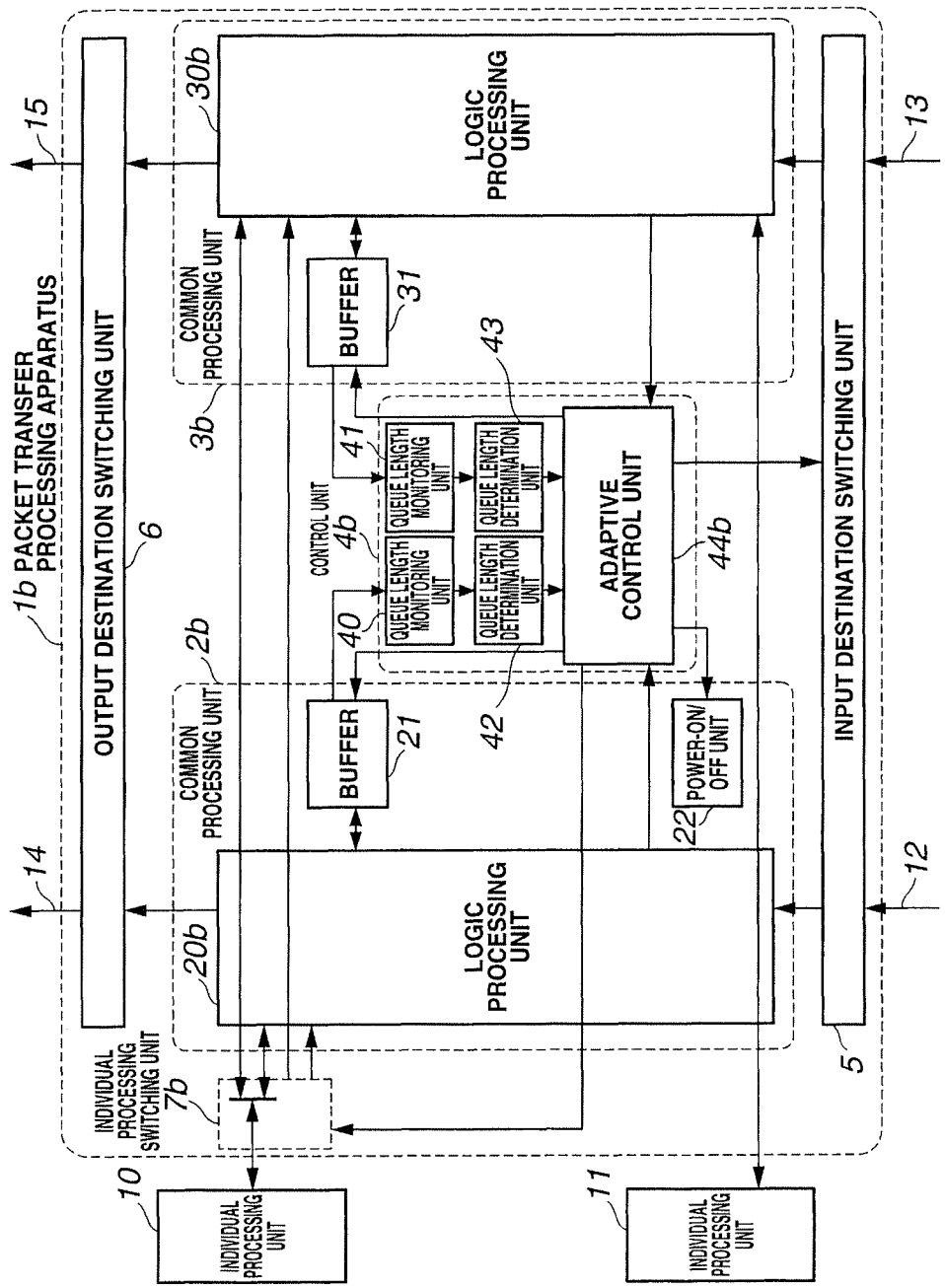
FIG. 6 is a block diagram showing the arrangement of a packet transfer processing device according to the third embodiment of the present invention.

The third embodiment of the present invention will be described next. FIG. 6 is a block diagram showing the arrangement of a packet transfer processing device according to the third embodiment of the present invention.

A packet transfer processing device 1b according to this embodiment includes a common processing unit 2b (first common processing unit), a common processing unit 3b (second common processing unit), a control unit 4b, an input destination switching unit 5, an output destination switching unit 6, and an individual processing switching unit 7b.

The common processing unit 2b includes a logic processing unit 20b (first logic processing unit), a buffer 21 (first buffer), and a power-on/off unit 22.

The common processing unit 3b includes a logic processing unit 30b (second logic processing unit) and a buffer 31 (second buffer).

The control unit 4b includes a queue length monitoring unit 40 (first queue length monitoring unit), a queue length monitoring unit 41 (second queue length monitoring unit), a queue length determination unit 42 (first queue length determination unit), a queue length determination unit 43 (second queue length determination unit), and an adaptive control unit 44b.

This embodiment is different from the second embodiment in the trigger to cause the common processing units to start transfer processing. In the second embodiment, when the common processing unit 2a or 3a sends a completion notification of transfer processing performed in cooperation with the external individual processing unit 10, the control unit 4a changes selection of the individual processing switching unit 7 and then instructs the newly selected common processing unit to execute transfer processing, and the common processing unit that has received the instruction starts the transfer processing. In this embodiment, however, the control unit 4b causes each common processing unit to start transfer processing when the common processing unit receives a selection notification output from the individual processing switching unit 7b when selection of the individual processing switching unit 7b is changed.

The operation of the packet transfer processing device 1b according to this embodiment will be described next with reference to FIG. 7. At the time of initialization (step S200 of FIG. 7), a packet received by a reception terminal 12 is input to the common processing unit 2b via the input destination switching unit 5. The individual processing switching unit 7b selects the common processing unit 2b, connects the common processing unit 2b and an individual processing unit 10, and sends a selection notification to the selected common processing unit 2b. Upon receiving the selection notification, the common processing unit 2b performs the packet transfer processing in cooperation with the external individual processing unit 10 via the individual processing switching unit 7b. The packet processed by the common processing unit 2b is transmitted from a transmission terminal 14 via the output destination switching unit 6.

At the time of initialization, a packet received by a reception terminal 13 is input to the common processing unit 3b via the input destination switching unit 5. The common processing unit 3b performs the packet transfer processing in cooperation with an external individual processing unit 11. The packet processed by the common processing unit 3b is transmitted from a transmission terminal 15 via the output destination switching unit 6.

When the queue length determination unit 42 determines that the accumulation amount of the buffer 21 is larger than a predetermined first threshold, the adaptive control unit 44b in the control unit 4b turns on the power supply function and supplies power to the common processing unit 2b, and also controls the input destination switching unit 5 such that the packet received by the reception terminal 12 is input to the common processing unit 2b, and the packet received by the reception terminal 13 is input to the common processing unit 3b.

When the queue length determination unit 42 determines that the accumulation amount of the buffer 21 is larger than the first threshold, the adaptive control unit 44b controls the individual processing switching unit 7b such that the common processing unit 2b and the external individual processing unit 10 cooperatively perform transfer processing of the packet received by the reception terminal 12 and input from the input destination switching unit 5 to the common processing unit 2b.

When the queue length determination unit 42 determines that the accumulation amount of the buffer 21 is larger than the first threshold, the adaptive control unit 44b permits the buffer 21 to output the packet received by the reception terminal 12, permits the buffer 31 to output the packet received by the reception terminal 13, prohibits the buffer 21 from outputting the packet received by the reception terminal 13, and prohibits the buffer 31 from outputting the packet received by the reception terminal 12.

The output destination switching unit 6 outputs, out of packets output from the common processing units 2b and 3b, the packet received by the reception terminal 12 and processed by the common processing unit 2b to the transmission terminal 14 and the packet received by the reception terminal 13 and processed by the common processing unit 3b to the transmission terminal 15.

Since the common processing unit 2b is selected, the individual processing switching unit 7b does not send the selection notification to the unselected common processing unit 3b. Hence, the common processing unit 3b cannot perform transfer processing of the packet received by the reception terminal 12. That is, cooperative processing of the common processing unit 3b and the individual processing unit 10 is prohibited.

In this way, when the accumulation amount of the buffer 21 is larger than the first threshold, the operation at the time of initialization continues.

When the traffic volume of packets received by the reception terminal 12 decreases, and the queue length determination unit 42 determines that the accumulation amount of the buffer 21 is equal to or smaller than the first threshold (YES in step S201 of FIG. 7), the adaptive control unit 44*b* operates as follows depending on whether the accumulation amount of the buffer 31 monitored by the queue length monitoring unit 41, that is, the total sum of the accumulation amount of packets received by the reception terminal 12 in the buffer 31 and the accumulation amount of packets received by the reception terminal 13 in the buffer 31 is determined to be smaller or larger than a predetermined second threshold.

When the queue length determination unit 43 determines that the accumulation amount of the buffer 31 is larger than the predetermined second threshold (NO in step S202 of FIG. 7), the control of the adaptive control unit 44*b* does not change, and the adaptive control unit 44*b* continues the current operation.

Figure 7:
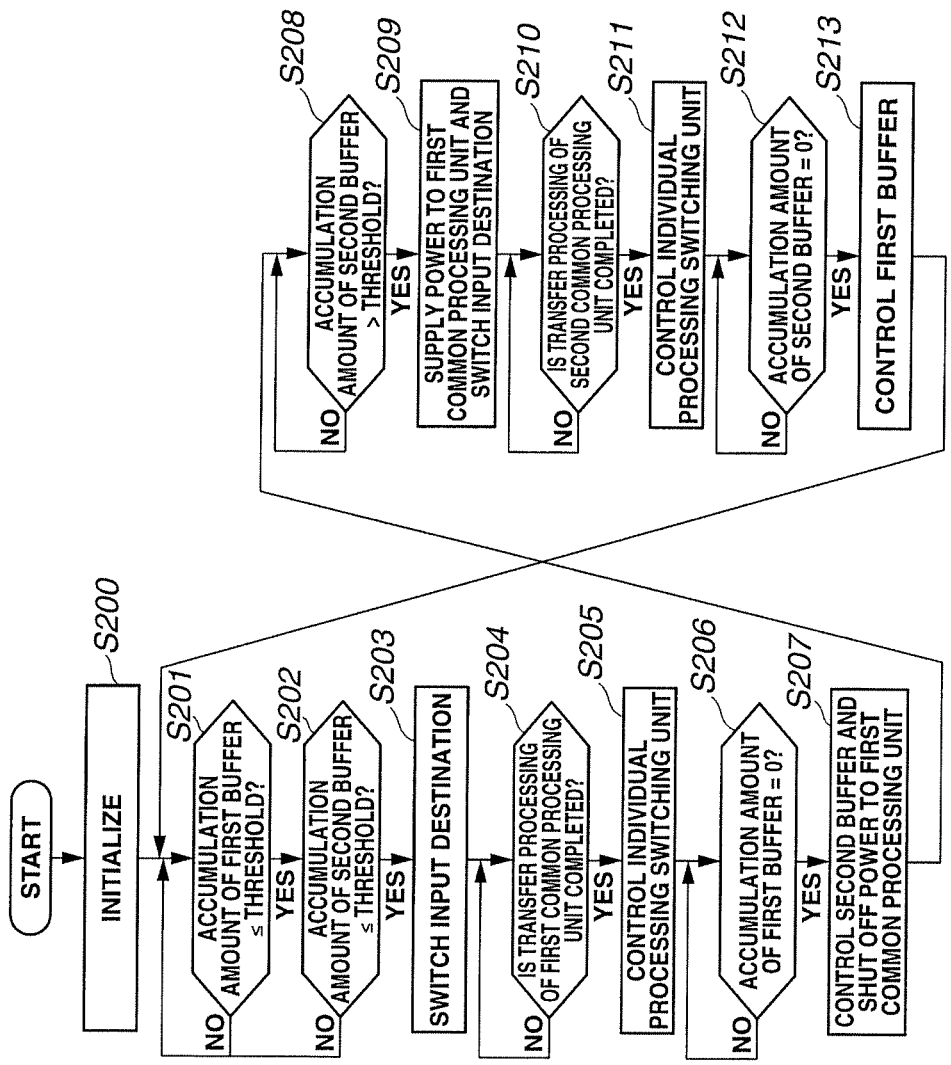
FIG. 7 is a flowchart showing the operation of the packet transfer processing device according to the third embodiment of the present invention.

On the other hand, when the queue length determination unit 42 determines that the accumulation amount of the buffer 21 is equal to or smaller than the first threshold (YES in step S201 of FIG. 7), and the queue length determination unit 43 determines that the accumulation amount of the buffer 31 is equal to or smaller than the second threshold (YES in step S202 of FIG. 7), the adaptive control unit 44*b* controls the input destination switching unit 5 to change the packet input destination such that the packet received by the reception terminal 12 is input to the common processing unit 3*b*, and the packet received by the reception terminal 13 is also input to the common processing unit 3*b* (step S203 of FIG. 7). However, the adaptive control unit 44*b* continues control of output prohibition at the time of initialization such that the buffer 31 does not output the packet received by the reception terminal 12.

The common processing unit 3*b* cannot perform transfer processing of the packet received by the reception terminal 12 because the selection notification from the individual processing switching unit 7*b* is not received. That is, prohibition of cooperative processing of the common processing unit 3*b* and the individual processing unit 10 continues.

When the packet input destination is switched, any packet received by the reception terminal 12 is not newly input to the common processing unit 2*b*. For this reason, transfer processing of packets received by the reception terminal 12 and accumulated in the buffer 21 is completed after a while. When the packet transfer processing is completed, the logic processing unit 20*b* in the common processing unit 2*b* notifies the adaptive control unit 44*b* of the completion of transfer processing.

When the adaptive control unit 44*b* receives the transfer processing completion notification (YES in step S204 of FIG. 7), the common processing unit 2*b* has already completed transfer processing performed in cooperation with the external individual processing unit 10. Hence, the individual processing unit 10 can be disconnected from the common processing unit 2*b* without any problem. The adaptive control unit 44*b* controls the individual processing switching unit 7*b* such that the common processing unit 3*b* and the external individual processing unit 10 cooperatively perform transfer processing of the packet received by the reception terminal 12 and input from the input destination switching unit 5 to the common processing unit 3*b* (step S205 of FIG. 7).

The individual processing switching unit 7*b* sends a switching completion notification representing selection to the newly selected common processing unit 3*b* and a switching completion notification representing nonselection to the common processing unit 2*b*. Upon receiving the switching completion notification, the logic processing unit 30*b* in the common processing unit 3*b* can perform transfer processing of the packet received by the reception terminal 12 and accumulated in the buffer 31 in cooperation with the individual processing unit 10. Additionally, the logic processing unit 30*b* performs transfer processing of the packet received by the reception terminal 13 and accumulated in the buffer 31 in cooperation with the individual processing unit 11, like at the time of initialization. However, the adaptive control unit 44*b* in the control unit 4*b* continues control of output prohibition at the time of initialization such that the buffer 31 does not output the packet received by the reception terminal 12.

When the queue length determination unit 42 determines that the accumulation amount of the buffer 21 is zero (YES in step S206 of FIG. 7), the adaptive control unit 44*b* permits the buffer 31 to output the packet received by the reception terminal 12 (step S207 of FIG. 7). The output destination switching unit 6 outputs, out of the packets output from the common processing unit 3*b*, the packet received by the reception terminal 12 to the transmission terminal 14 and the packet received by the reception terminal 13 to the transmission terminal 15.

Upon determining that the accumulation amount of the buffer 21 is zero, the adaptive control unit 44*b* controls the power-on/off unit 22 in the common processing unit 2*b* to turn off the power supply function and shut off power supply to the common processing unit 2*b* (step S207).

When the queue length determination unit 43 determines that the accumulation amount of the buffer 31, that is, the total sum of the amount of packets received by the reception terminal 12 in the buffer 31 and the amount of packets received by the reception terminal 13 in the buffer 31 is larger than the predetermined second threshold (YES in step S208 of FIG. 7), the adaptive control unit 44*b* controls the power-on/off unit 22 to turn on the power supply function and supply power to the common processing unit 2*b* (step S209 of FIG. 7).

The adaptive control unit 44*b* controls output prohibition such that the buffer 21 does not output the packet, and also controls the input destination switching unit 5 to change the packet input destination such that the packet received by the reception terminal 12 is input to the common processing unit 2*b*, and the packet received by the reception terminal 13 is input to the common processing unit 3*b* (step S209). At this time, the common processing unit 2*b* cannot perform transfer processing of the packet received by the reception terminal 12 because the switching completion notification representing selection is not received from the individual processing switching unit 7*b*. That is, prohibition of cooperative processing of the common processing unit 2*b* and the individual processing unit 10 continues.

When the packet input destination is switched, any packet received by the reception terminal 12 is not newly input to the common processing unit 3*b*. For this reason, transfer processing of packets received by the reception terminal 12 and accumulated in the buffer 31 is completed after a while. When transfer processing of the packets received by the reception terminal 12 is completed, the logic processing unit 30*b* in the common processing unit 3*b* notifies the control unit 4*b* of the completion of transfer processing.

When the adaptive control unit 44*b* receives the transfer processing completion notification (YES in step S210 of FIG. 7), the common processing unit 3*b* has already completed transfer processing performed in cooperation with the external individual processing unit 10. Hence, the individual processing unit 10 can be disconnected from the common processing unit 3*b* without any problem. The adaptive control unit 44*b* controls the individual processing switching unit 7*b* such that the common processing unit 2*b* and the external individual processing unit 10 cooperatively perform transfer processing of the packet received by the reception terminal 12 and input from the input destination switching unit 5 to the common processing unit 2b (step S211 of FIG. 7).

The individual processing switching unit 7b sends a switching completion notification representing selection to the newly selected common processing unit 2b and a switching completion notification representing nonselection to the common processing unit 3b. Upon receiving the switching completion notification, the logic processing unit 20b in the common processing unit 2b can perform transfer processing of the packet received by the reception terminal 12 and accumulated in the buffer 21 in cooperation with the individual processing unit 10. However, the adaptive control unit 44b continues control of output prohibition such that the buffer 21 does not output the packet received by the reception terminal 12.

When the queue length determination unit 43 determines that, out of the accumulation amount of the buffer 31, the accumulation amount of packets received by the reception terminal 12 in the buffer 31 is zero (YES in step S212 of FIG. 7), the adaptive control unit 44b permits the buffer 21 to output the packet received by the reception terminal 12 (step S213 of FIG. 7). The adaptive control unit 44b then returns to step S201.

The packet transfer processing device 1b thus returns to the state at the time of initialization. More specifically, the common processing unit 2b performs the packet transfer processing in cooperation with the external individual processing unit 10 via the individual processing switching unit 7b. The packet processed by the common processing unit 2b is transmitted from the transmission terminal 14 via the output destination switching unit 6. The packet received by the reception terminal 13 is input to the common processing unit 3b via the input destination switching unit 5. The common processing unit 3b performs the packet transfer processing in cooperation with the external individual processing unit 11. The packet processed by the common processing unit 3b is transmitted from the transmission terminal 15 via the output destination switching unit 6. The adaptive control unit 44b controls such that the buffer 31 does not output the packet received by the reception terminal 12.

According to the above-described procedure, even when control is performed to cause only one common processing unit 3b to perform the packet transfer processing, shut off power to the other common processing unit 2b, and resume power supply and return to processing by both the common processing units 2b and 3b, packet loss or order change does not occur. In this embodiment, when the total sum of the amounts of received packets decreases to an amount processable by one common processing unit 3b, the power consumption of the packet transfer processing device 1b can be reduced.

Fourth Embodiment

Figure 8:
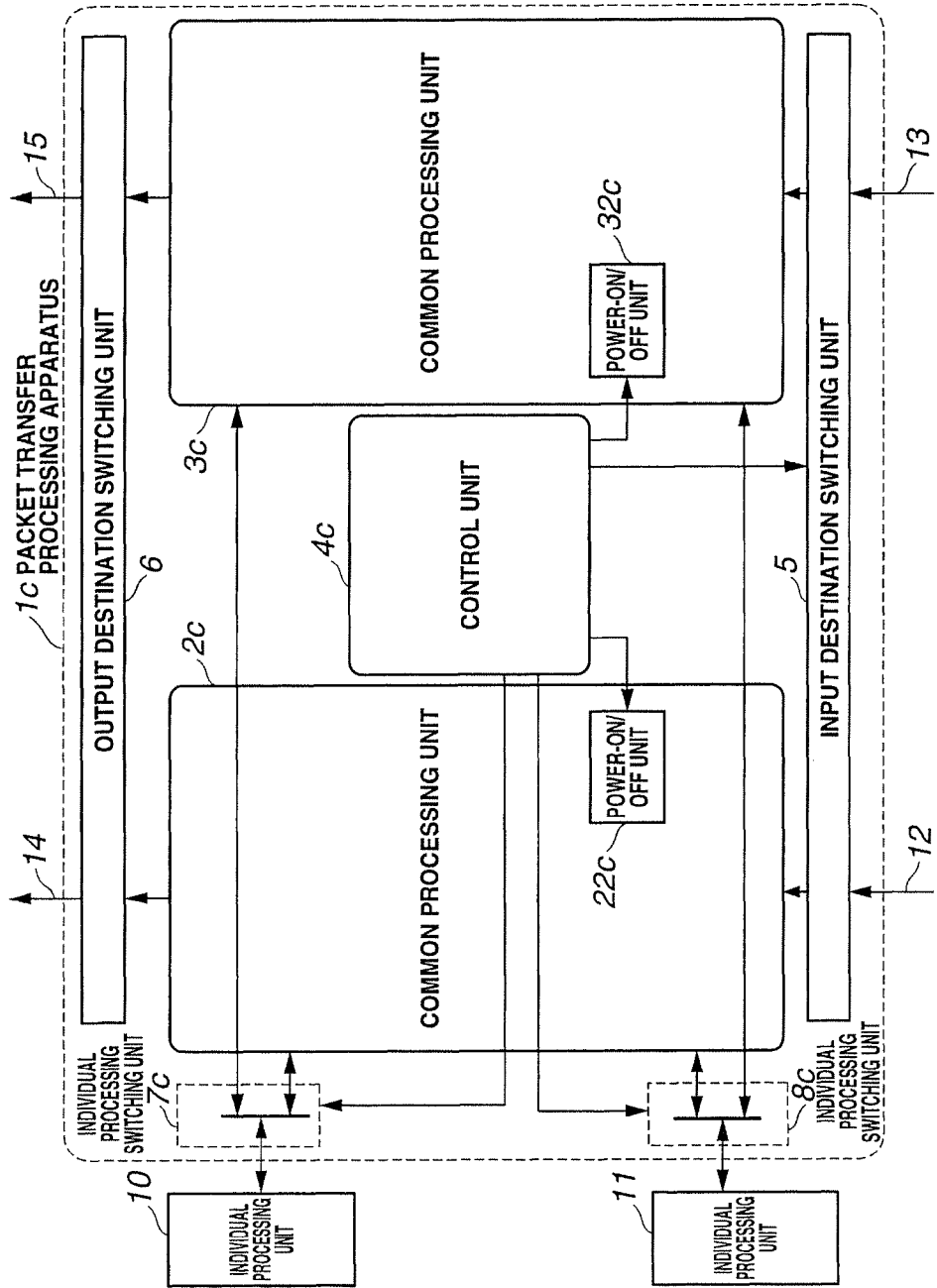
FIG. 8 is a block diagram showing the arrangement of a packet transfer processing device according to the fourth embodiment of the present invention.

The fourth embodiment of the present invention will be described next. FIG. 8 is a block diagram showing the arrangement of a packet transfer processing device according to the fourth embodiment of the present invention.

A packet transfer processing device 1c according to this embodiment includes a common processing unit 2c (first common processing unit), a common processing unit 3c (second common processing unit), a control unit 4c, an input destination switching unit 5, an output destination switching unit 6, an individual processing switching unit 7c (first individual processing switching unit), and an individual processing switching unit 8c (second individual processing switching unit).

In the first embodiment, it is possible to power off the common processing unit 2 and cause only the common processing unit 3 to perform packet processing. In this embodiment, however, it is possible to power off the common processing unit 2c and cause only the common processing unit 3c to perform packet processing and also possible to power off the common processing unit 3c and cause only the common processing unit 2c to perform packet processing.

The operation of the packet transfer processing device 1c according to this embodiment will be described next with reference to FIG. 9. In this embodiment, to power off the common processing unit 2c and cause only the common processing unit 3c to perform packet processing, the control unit 4c controls the input destination switching unit 5 such that a packet received by a reception terminal 12 is input to the common processing unit 3c, and a packet received by a reception terminal 13 is also input to the common processing unit 3c, as in the first embodiment (steps S20 and S21 of FIG. 9). The control unit 4c controls a power-on/off unit 22c in the common processing unit 2c to turn off the power supply function and shut off power supply to the common processing unit 2c (step S22 of FIG. 9).

Figure 9:
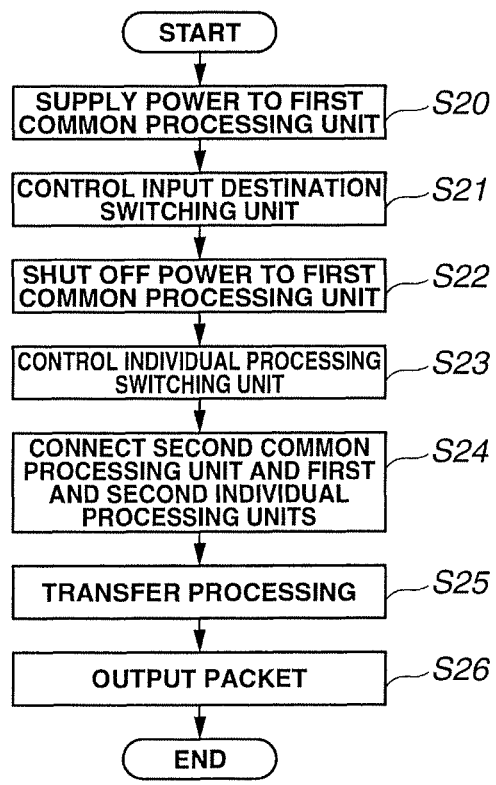
FIG. 9 is a flowchart showing the operation of the packet transfer processing device according to the fourth embodiment of the present invention.

The control unit 4c controls the individual processing switching unit 7c such that the common processing unit 3c and an external individual processing unit 10 cooperatively perform transfer processing of the packet received by the reception terminal 12 and input from the input destination switching unit 5 to the common processing unit 3c (step S23 of FIG. 9). With this control, the common processing unit 3c and the individual processing unit 10 are connected (step S24 of FIG. 9). The common processing unit 3c performs transfer processing of the packet received by the reception terminal 12 and input from the input destination switching unit 5 to the common processing unit 3c in cooperation with the individual processing unit 10 (step S25 of FIG. 9).

Additionally, in this embodiment, the control unit 4c controls the individual processing switching unit 8c such that the common processing unit 3c and an external individual processing unit 11 cooperatively perform transfer processing of the packet received by the reception terminal 13 and input from the input destination switching unit 5 to the common processing unit 3c (step S23). With this control, the common processing unit 3c and the individual processing unit 11 are connected (step S24). The common processing unit 3c performs transfer processing of the packet received by the reception terminal 13 and input from the input destination switching unit 5 to the common processing unit 3c in cooperation with the individual processing unit 11 (step S25).

The output destination switching unit 6 outputs, out of packets output from the common processing unit 3c, the packet received by the reception terminal 12 to a transmission terminal 14 and the packet received by the reception terminal 13 to a transmission terminal 15 (step S26 of FIG. 9).

An operation when powering off the common processing unit 3c will be described next with reference to FIG. 10. To power off the common processing unit 3c and cause only the common processing unit 2c to perform packet processing, the control unit 4c controls the input destination switching unit 5 such that a packet received by the reception terminal 12 is input to the common processing unit 2c, and a packet received by the reception terminal 13 is also input to the common processing unit 2c (steps S30 and S31 of FIG. 10). The control unit 4c controls a power-on/off unit 32c in the common processing unit 3c to turn off the power supply function and shut off power supply to the common processing unit 3c (step S32 of FIG. 10).

Figure 10:
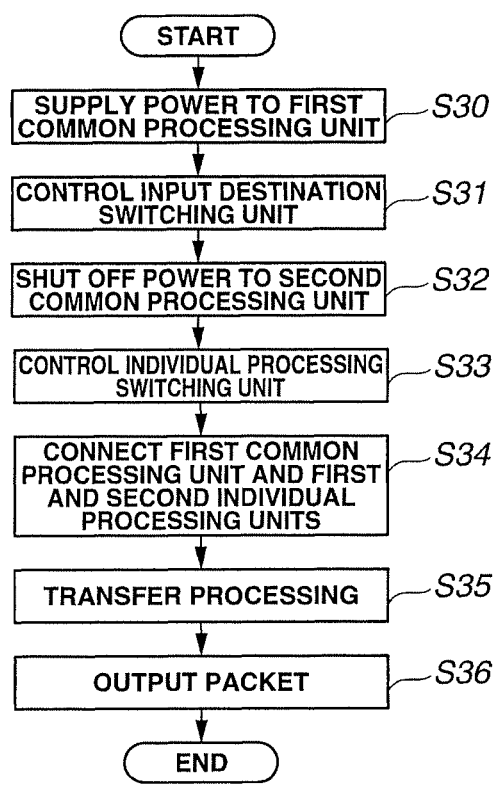
FIG. 10 is a flowchart showing the operation of the packet transfer processing device according to the fourth embodiment of the present invention.

The control unit 4c controls the individual processing switching unit 7c such that the common processing unit 2c and the external individual processing unit 10 cooperatively perform transfer processing of the packet received by the reception terminal 12 and input from the input destination switching unit 5 to the common processing unit 2c (step S33 of FIG. 10). With this control, the common processing unit 2c and the individual processing unit 10 are connected (step S34 of FIG. 10). The common processing unit 2c performs transfer processing of the packet received by the reception terminal 12 and input from the input destination switching unit 5 to the common processing unit 2c in cooperation with the individual processing unit 10 (step S35 of FIG. 10).

Additionally, the control unit 4c controls the individual processing switching unit 8c such that the common processing unit 2c and the external individual processing unit 11 cooperatively perform transfer processing of the packet received by the reception terminal 13 and input from the input destination switching unit 5 to the common processing unit 2c (step S33). With this control, the common processing unit 2c and the individual processing unit 11 are connected (step S34). The common processing unit 2c performs transfer processing of the packet received by the reception terminal 13 and input from the input destination switching unit 5 to the common processing unit 2c in cooperation with the individual processing unit 11 (step S35).

The output destination switching unit 6 outputs, out of packets output from the common processing unit 2c, the packet received by the reception terminal 12 to the transmission terminal 14 and the packet received by the reception terminal 13 to the transmission terminal 15 (step S36 of FIG. 10).

As described above, in this embodiment, when the total sum of the amount of packets to be received by the reception terminal 12 and the amount of packets to be received by the reception terminal 13 is an amount processable by one common processing unit, the power consumption of the packet transfer processing device 1c can be reduced, as in the first embodiment, independently of which common processing unit is the subject to power off.

Fifth Embodiment

Figure 11:
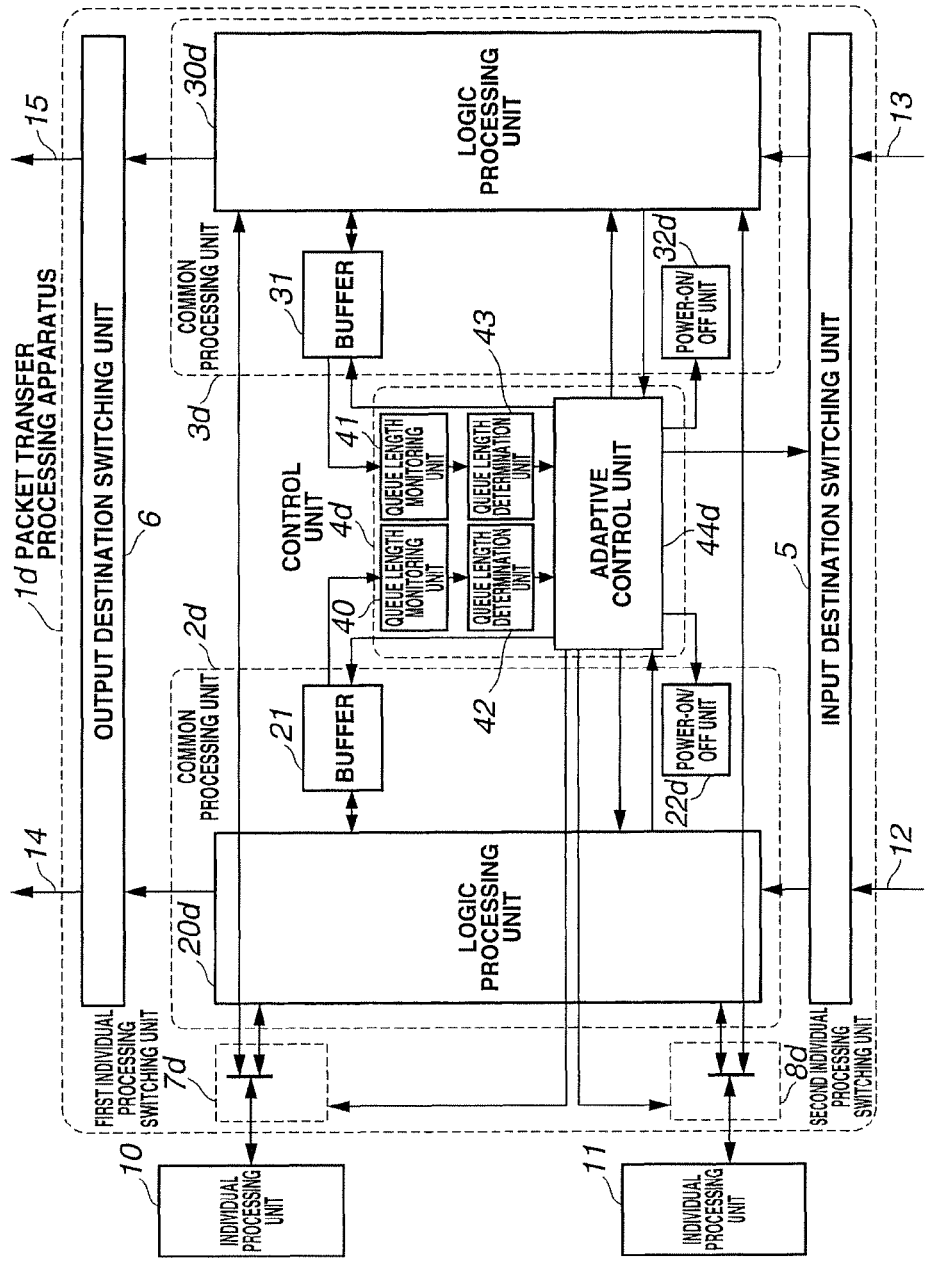
FIG. 11 is a block diagram showing the arrangement of a packet transfer processing device according to the fifth embodiment of the present invention.

The fifth embodiment of the present invention will be described next. FIG. 11 is a block diagram showing the arrangement of a packet transfer processing device according to the fifth embodiment of the present invention.

A packet transfer processing device 1d according to this embodiment includes a common processing unit 2d (first common processing unit), a common processing unit 3d (second common processing unit), a control unit 4d, an input destination switching unit 5, an output destination switching unit 6, an individual processing switching unit 7d (first individual processing switching unit), and an individual processing switching unit 8d (second individual processing switching unit).

The common processing unit 2d includes a logic processing unit 20d (first logic processing unit), a buffer 21 (first buffer), and a power-on/off unit 22d (first power-on/off unit).

The common processing unit 3d includes a logic processing unit 30d (second logic processing unit), a buffer 31 (second buffer), and a power-on/off unit 32d (second power-on/off unit).

The control unit 4d includes a queue length monitoring unit 40 (first queue length monitoring unit), a queue length monitoring unit 41 (second queue length monitoring unit), a queue length determination unit 42 (first queue length determination unit), a queue length determination unit 43 (second queue length determination unit), and an adaptive control unit 44d.

In the second and third embodiments, it is possible to power off the common processing unit 2a or 2b and cause only the common processing unit 3a or 3b to perform packet processing. In this embodiment, however, it is possible to power off the common processing unit 2d and cause only the common processing unit 3d to perform packet processing and also possible to power off the common processing unit 3d and cause only the common processing unit 2d to perform packet processing.

Figure 12:
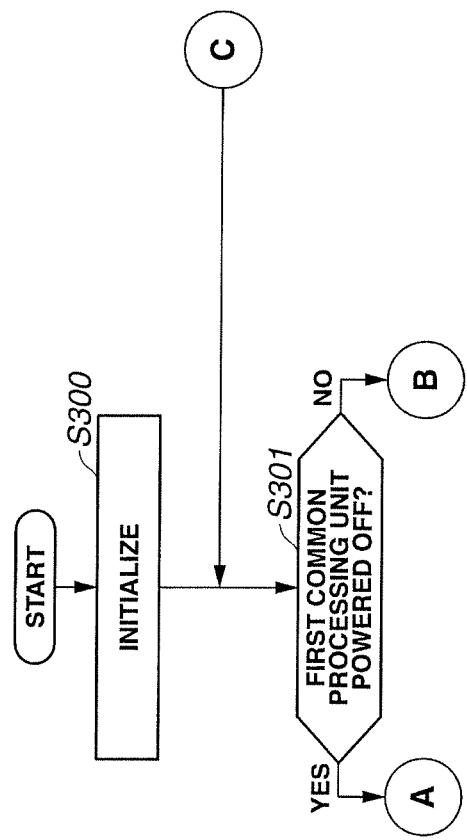
FIG. 12 is a flowchart showing the operation of the packet transfer processing device according to the fifth embodiment of the present invention.

The operation of the packet transfer processing device 1d according to this embodiment will be described next with reference to FIGS. 12 to 14. At the time of initialization (step S300 of FIG. 12), a packet received by a reception terminal 12 is input to the common processing unit 2d via the input destination switching unit 5. The individual processing switching unit 7d connects the common processing unit 2d and an individual processing unit 10. The common processing unit 2d performs the packet transfer processing in cooperation with the external individual processing unit 10 via the individual processing switching unit 7d. The packet processed by the common processing unit 2d is transmitted from a transmission terminal 14 via the output destination switching unit 6.

At the time of initialization, a packet received by a reception terminal 13 is input to the common processing unit 3d via the input destination switching unit 5. The individual processing switching unit 8d connects the common processing unit 3d and an individual processing unit 11. The common processing unit 3d performs the packet transfer processing in cooperation with the external individual processing unit 11 via the individual processing switching unit 8d. The packet processed by the common processing unit 3d is transmitted from a transmission terminal 15 via the output destination switching unit 6.

An operation when powering off the common processing unit 2d and causing only the common processing unit 3d to perform packet processing (YES in step S301 of FIG. 12) is performed as follows.

The queue length monitoring unit 40 monitors the accumulation amount of the buffer 21 for each reception terminal that has received a packet. When the queue length determination unit 42 determines that the accumulation amount of the buffer 21, that is, the total sum of the accumulation amount of packets received by the reception terminal 12 in the buffer 21 and the accumulation amount of packets received by the reception terminal 13 in the buffer 21 is larger than a predetermined first threshold, the adaptive control unit 44d in the control unit 4d controls the power-on/off unit 22d in the common processing unit 2d and the power-on/off unit 32d in the common processing unit 3d to turn on the power supply function and supply power to the common processing units 2d and 3d, and also controls the input destination switching unit 5 such that the packet received by the reception terminal 12 is input to the common processing unit 2d, and the packet received by the reception terminal 13 is input to the common processing unit 3d.

When the queue length determination unit 42 determines that the accumulation amount of the buffer 21 is larger than the first threshold, the adaptive control unit 44d controls the individual processing switching unit 7d such that the common processing unit 2d and the external individual processing unit 10 cooperatively perform transfer processing of the packet received by the reception terminal 12 and input from the input destination switching unit 5 to the common processing unit 2d, and also controls the individual processing switching unit 8d such that the common processing unit 3d and the external individual processing unit 11 cooperatively perform transfer processing of the packet received by the reception terminal 13 and input from the input destination switching unit 5 to the common processing unit 3d.

When the queue length determination unit 42 determines that the accumulation amount of the buffer 21 is larger than the first threshold, the adaptive control unit 44d permits the buffer 21 to output the packet received by the reception terminal 12, permits the buffer 31 to output the packet received by the reception terminal 13, prohibits the buffer 21 from outputting the packet received by the reception terminal 13, and prohibits the buffer 31 from outputting the packet received by the reception terminal 12. In addition, the adaptive control unit 44d prohibits the common processing unit 2d from performing transfer processing of the packet received by the reception terminal 13, and prohibits the common processing unit 3d from performing transfer processing of the packet received by the reception terminal 12.

The output destination switching unit 6 outputs, out of packets output from the common processing units 2d and 3d, the packet received by the reception terminal 12 and processed by the common processing unit 2d to the transmission terminal 14 and the packet received by the reception terminal 13 and processed by the common processing unit 3d to the transmission terminal 15.

In this way, when the accumulation amount of the buffer 21 is larger than the first threshold, the operation at the time of initialization continues.

When the traffic volume of packets received by the reception terminal 12 decreases, and the queue length determination unit 42 determines that the accumulation amount of the buffer 21 is equal to or smaller than the first threshold (YES in step S302 of FIG. 13), the adaptive control unit 44d operates as follows depending on whether the accumulation amount of the buffer 31 monitored by the queue length monitoring unit 41, that is, the total sum of the accumulation amount of packets received by the reception terminal 12 in the buffer 31 and the accumulation amount of packets received by the reception terminal 13 in the buffer 31 is determined to be smaller or larger than a predetermined second threshold.

When the queue length determination unit 43 determines that the accumulation amount of the buffer 31 is larger than the predetermined second threshold (NO in step S303 of FIG. 13), the control of the adaptive control unit 44d does not change, and the adaptive control unit 44d continues the current operation.

Figure 13:
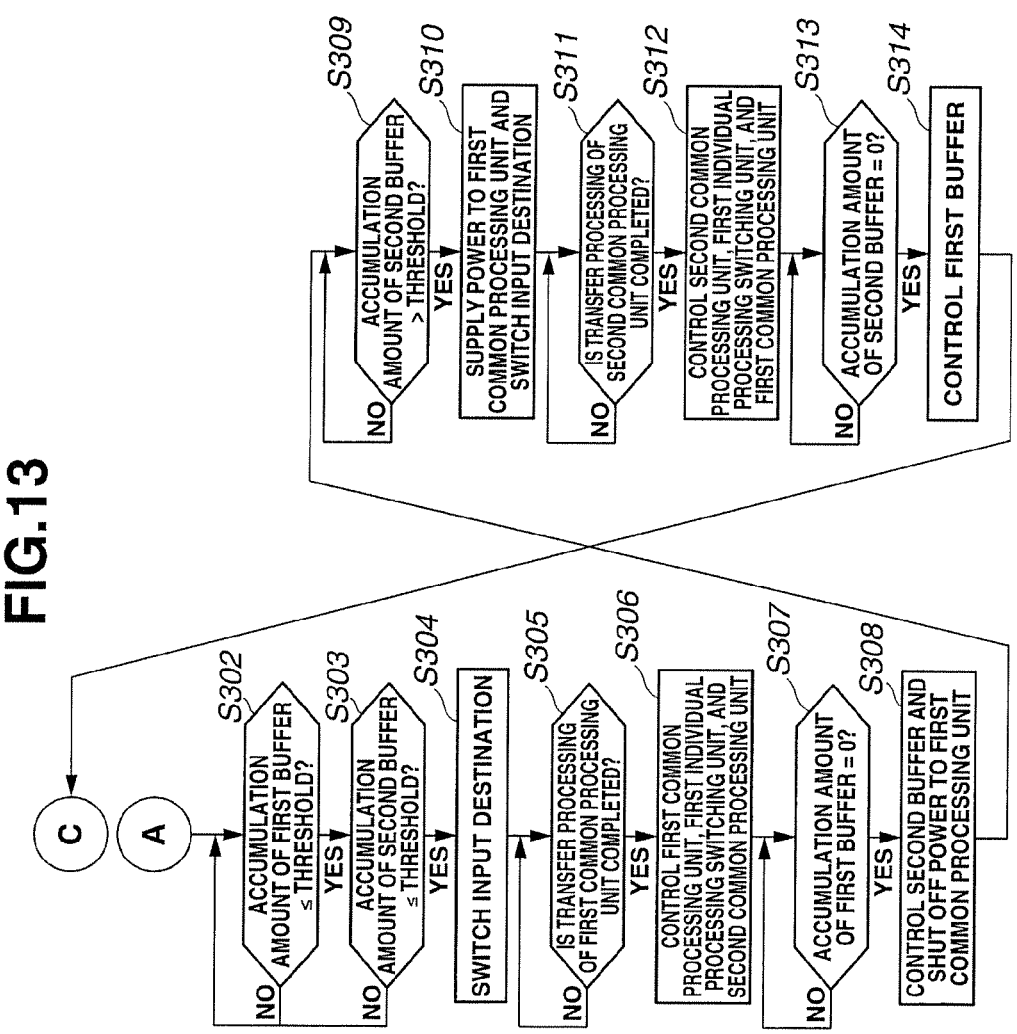
FIG. 13 is a flowchart showing the operation of the packet transfer processing device according to the fifth embodiment of the present invention.

On the other hand, when the queue length determination unit 42 determines that the accumulation amount of the buffer 21 is equal to or smaller than the first threshold (YES in step S302 of FIG. 13), and the queue length determination unit 43 determines that the accumulation amount of the buffer 31 is equal to or smaller than the second threshold (YES in step S303 of FIG. 13), the adaptive control unit 44d controls the input destination switching unit 5 to change the packet input destination such that the packet received by the reception terminal 12 is input to the common processing unit 3d, and the packet received by the reception terminal 13 is also input to the common processing unit 3d (step S304 of FIG. 13). However, the adaptive control unit 44d continues control of output prohibition at the time of initialization such that the buffer 31 does not output the packet received by the reception terminal 12.

When the packet input destination is switched, any packet received by the reception terminal 12 is not newly input to the common processing unit 2d. For this reason, transfer processing of packets received by the reception terminal 12 and accumulated in the buffer 21 is completed after a while. When transfer processing of the packets received by the reception terminal 12 is completed, the logic processing unit 20d in the common processing unit 2d notifies the adaptive control unit 44d of the completion of transfer processing.

Upon receiving the transfer processing completion notification from the logic processing unit 20d (YES in step S305 of FIG. 13), the adaptive control unit 44d prohibits the common processing unit 2d from performing transfer processing of the packet received by the reception terminal 12 (step S306 of FIG. 13). When the adaptive control unit 44d receives the transfer processing completion notification, the common processing unit 2d has already completed transfer processing performed in cooperation with the external individual processing unit 10. Hence, the individual processing unit 10 can be disconnected from the common processing unit 2d without any problem. The adaptive control unit 44d controls the individual processing switching unit 7d such that the common processing unit 3d and the external individual processing unit 10 cooperatively perform transfer processing of the packet received by the reception terminal 12 and input from the input destination switching unit 5 to the common processing unit 3d (step S306).

Next, the adaptive control unit 44d permits the common processing unit 3d to perform transfer processing of the packet received by the reception terminal 12 (step S306). According to this permission, the logic processing unit 30d in the common processing unit 3d performs transfer processing of the packet received by the reception terminal 12 and accumulated in the buffer 31 in cooperation with the individual processing unit 10. Additionally, the logic processing unit 30d performs transfer processing of the packet received by the reception terminal 13 and accumulated in the buffer 31 in cooperation with the individual processing unit 11, like at the time of initialization.

When the queue length determination unit 42 determines that the accumulation amount of the buffer 21 is zero (YES in step S307 of FIG. 13), the adaptive control unit 44d permits the buffer 31 to output the packet received by the reception terminal 12 (step S308 of FIG. 13). The output destination switching unit 6 outputs, out of the packets output from the common processing unit 3d, the packet received by the reception terminal 12 to the transmission terminal 14 and the packet received by the reception terminal 13 to the transmission terminal 15.

Upon determining that the accumulation amount of the buffer 21 is zero, the adaptive control unit 44d controls the power-on/off unit 22d in the common processing unit 2d to turn off the power supply function and shut off power supply to the common processing unit 2d (step S308).

When the queue length determination unit 43 determines that the accumulation amount of the buffer 31, that is, the total sum of the amount of packets received by the reception terminal 12 in the buffer 31 and the amount of packets received by the reception terminal 13 in the buffer 31 is larger than the predetermined second threshold (YES in step S309 of FIG. 13), the adaptive control unit 44d controls the power-on/off unit 22d to turn on the power supply function and supply power to the common processing unit 2d (step S310 of FIG. 13).

As in the preceding control, the adaptive control unit 44d prohibits the common processing unit 2d from performing transfer processing of the packet received by the reception terminal 12. The adaptive control unit 44d controls output prohibition such that the buffer 21 does not output the packet, and also controls the input destination switching unit 5 to change the packet input destination such that the packet received by the reception terminal 12 is input to the common processing unit 2d, and the packet received by the reception terminal 13 is input to the common processing unit 3d (step S310 of FIG. 13).

When the packet input destination is switched, any packet received by the reception terminal 12 is not newly input to the common processing unit 3d. For this reason, transfer processing of packets received by the reception terminal 12 and accumulated in the buffer 31 is completed after a while. When transfer processing of the packets received by the reception terminal 12 is completed, the logic processing unit 30d in the common processing unit 3d notifies the control unit 4d of the completion of transfer processing.

Upon receiving the transfer processing completion notification from the logic processing unit 30d (YES in step S311 of FIG. 13), the adaptive control unit 44d prohibits the common processing unit 3d from performing transfer processing of the packet received by the reception terminal 12 (step S312 of FIG. 13). When the adaptive control unit 44d receives the transfer processing completion notification, the common processing unit 3d has already completed transfer processing performed in cooperation with the external individual processing unit 10. Hence, the individual processing unit 10 can be disconnected from the common processing unit 3d without any problem. The adaptive control unit 44d controls the individual processing switching unit 7d such that the common processing unit 2d and the external individual processing unit 10 cooperatively perform transfer processing of the packet received by the reception terminal 12 and input from the input destination switching unit 5 to the common processing unit 2d (step S312).

Next, the adaptive control unit 44d permits the common processing unit 2d to perform transfer processing of the packet received by the reception terminal 12 (step S312). According to this permission, the logic processing unit 20d in the common processing unit 2d performs transfer processing of the packet received by the reception terminal 12 and accumulated in the buffer 21 in cooperation with the individual processing unit 10.

When the queue length determination unit 43 determines that, out of the accumulation amount of the buffer 31, the accumulation amount of packets received by the reception terminal 12 in the buffer 31 is zero (YES in step S313 of FIG. 13), the adaptive control unit 44d permits the buffer 21 to output the packet received by the reception terminal 12 (step S314 of FIG. 13). The adaptive control unit 44d then returns to step S301.

The packet transfer processing device 1d thus returns to the state at the time of initialization. More specifically, the common processing unit 2d performs the packet transfer processing in cooperation with the external individual processing unit 10 via the individual processing switching unit 7d. The packet processed by the common processing unit 2d is transmitted from the transmission terminal 14 via the output destination switching unit 6. The packet received by the reception terminal 13 is input to the common processing unit 3d via the input destination switching unit 5. The common processing unit 3d performs the packet transfer processing in cooperation with the external individual processing unit 11 via the individual processing switching unit 8d. The packet processed by the common processing unit 3d is transmitted from the transmission terminal 15 via the output destination switching unit 6. The adaptive control unit 44d controls such that the buffer 31 does not output the packet received by the reception terminal 12.

An operation when powering off the common processing unit 3d and causing only the common processing unit 2d to perform packet processing (NO in step S301 of FIG. 12) will be described next. The operation at the time of initialization is the same as described above.

When the traffic volume of packets received by the reception terminal 13 decreases, and the queue length determination unit 43 determines that the accumulation amount of the buffer 31 is equal to or smaller than the second threshold (YES in step S315 of FIG. 14), the adaptive control unit 44d operates as follows depending on whether the accumulation amount of the buffer 21 monitored by the queue length monitoring unit 40, that is, the total sum of the accumulation amount of packets received by the reception terminal 12 in the buffer 21 and the accumulation amount of packets received by the reception terminal 13 in the buffer 21 is determined to be smaller or larger than the predetermined first threshold.

When the queue length determination unit 43 determines that the accumulation amount of the buffer 21 is larger than the predetermined first threshold (NO in step S316 of FIG. 14), the control of the adaptive control unit 44d does not change, and the adaptive control unit 44d continues the current operation.

Figure 14:
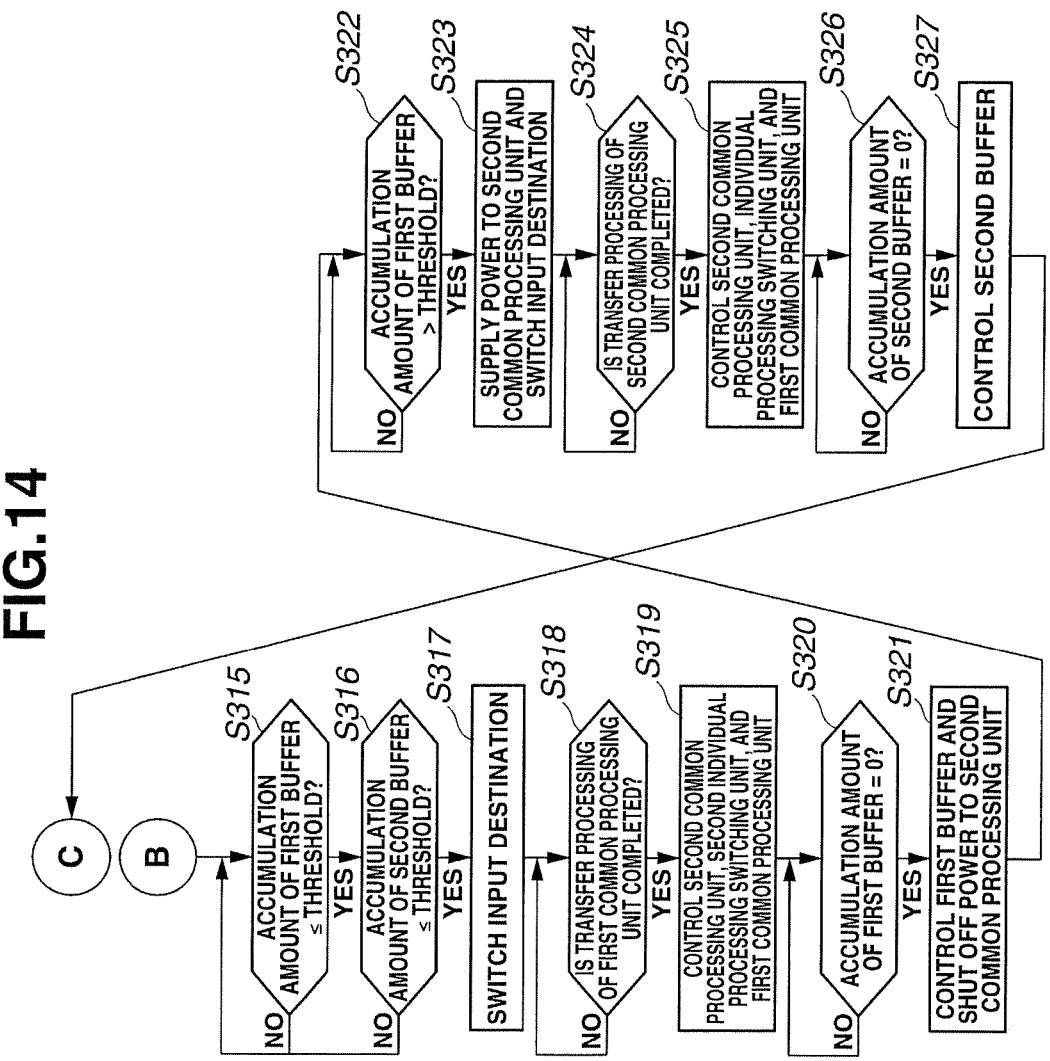
FIG. 14 is a flowchart showing the operation of the packet transfer processing device according to the fifth embodiment of the present invention.

On the other hand, when the queue length determination unit 43 determines that the accumulation amount of the buffer 31 is equal to or smaller than the second threshold (YES in step S315 of FIG. 14), and the queue length determination unit 42 determines that the accumulation amount of the buffer 21 is equal to or smaller than the first threshold (YES in step S316 of FIG. 14), the adaptive control unit 44d controls the input destination switching unit 5 to change the packet input destination such that the packet received by the reception terminal 12 is input to the common processing unit 2d, and the packet received by the reception terminal 13 is also input to the common processing unit 2d (step S317 of FIG. 14). However, the adaptive control unit 44d continues control of output prohibition at the time of initialization such that the buffer 21 does not output the packet received by the reception terminal 13.

When the packet input destination is switched, any packet received by the reception terminal 13 is not newly input to the common processing unit 3d. For this reason, transfer processing of packets received by the reception terminal 13 and accumulated in the buffer 31 is completed after a while. When transfer processing of the packets received by the reception terminal 13 is completed, the logic processing unit 30d in the common processing unit 3d notifies the adaptive control unit 44d of the completion of transfer processing.

Upon receiving the transfer processing completion notification from the logic processing unit 30d (YES in step S318 of FIG. 14), the adaptive control unit 44d prohibits the common processing unit 3d from performing transfer processing of the packet received by the reception terminal 13 (step S319 of FIG. 14). When the adaptive control unit 44d receives the transfer processing completion notification, the common processing unit 3d has already completed transfer processing performed in cooperation with the external individual processing unit 11. Hence, the individual processing unit 11 can be disconnected from the common processing unit 3d without any problem. The adaptive control unit 44d controls the individual processing switching unit 8d such that the common processing unit 2d and the external individual processing unit 11 cooperatively perform transfer processing of the packet received by the reception terminal 13 and input from the input destination switching unit 5 to the common processing unit 2d (step S319).

Next, the adaptive control unit 44d permits the common processing unit 2d to perform transfer processing of the packet received by the reception terminal 13 (step S319).

According to this permission, the logic processing unit 20d in the common processing unit 2d performs transfer processing of the packet received by the reception terminal 13 and accumulated in the buffer 21 in cooperation with the individual processing unit 11. Additionally, the logic processing unit 20d performs transfer processing of the packet received by the reception terminal 12 and accumulated in the buffer 21 in cooperation with the individual processing unit 10, like at the time of initialization.

When the queue length determination unit 43 determines that the accumulation amount of the buffer 31 is zero (YES in step S320 of FIG. 14), the adaptive control unit 44d permits the buffer 21 to output the packet received by the reception terminal 13 (step S321 of FIG. 14). The output destination switching unit 6 outputs, out of the packets output from the common processing unit 2d, the packet received by the reception terminal 12 to the transmission terminal 14 and the packet received by the reception terminal 13 to the transmission terminal 15.

Upon determining that the accumulation amount of the buffer 31 is zero, the adaptive control unit 44d controls the power-on/off unit 32d in the common processing unit 3d to turn off the power supply function and shut off power supply to the common processing unit 3d (step S321).

When the queue length determination unit 42 determines that the accumulation amount of the buffer 21, that is, the total sum of the amount of packets received by the reception terminal 12 in the buffer 21 and the amount of packets received by the reception terminal 13 in the buffer 21 is larger than the predetermined first threshold (YES in step S322 of FIG. 14), the adaptive control unit 44d controls the power-on/off unit 32d to turn on the power supply function and supply power to the common processing unit 3d (step S323 of FIG. 14).

As in the preceding control, the adaptive control unit 44d prohibits the common processing unit 3d from performing transfer processing of the packet received by the reception terminal 13. The adaptive control unit 44d controls output prohibition such that the buffer 31 does not output the packet, and also controls the input destination switching unit 5 to change the packet input destination such that the packet received by the reception terminal 12 is input to the common processing unit 2d, and the packet received by the reception terminal 13 is input to the common processing unit 3d (step S323 of FIG. 14).

When the packet input destination is switched, any packet received by the reception terminal 13 is not newly input to the common processing unit 2d. For this reason, transfer processing of packets received by the reception terminal 13 and accumulated in the buffer 21 is completed after a while. When transfer processing of the packets received by the reception terminal 13 is completed, the logic processing unit 20d in the common processing unit 2d notifies the control unit 4d of the completion of transfer processing.

Upon receiving the transfer processing completion notification from the logic processing unit 20d (YES in step S324 of FIG. 14), the adaptive control unit 44d prohibits the common processing unit 2d from performing transfer processing of the packet received by the reception terminal 13 (step S325 of FIG. 14). When the adaptive control unit 44d receives the transfer processing completion notification, the common processing unit 2d has already completed transfer processing performed in cooperation with the external individual processing unit 11. Hence, the individual processing unit 11 can be disconnected from the common processing unit 2d without any problem. The adaptive control unit 44d controls the individual processing switching unit 8d such that the common processing unit 3d and the external individual processing unit 11 cooperatively perform transfer processing of the packet received by the reception terminal 13 and input from the input destination switching unit 5 to the common processing unit 3d (step S325).

Next, the adaptive control unit 44d permits the common processing unit 3d to perform transfer processing of the packet received by the reception terminal 13 (step S325). According to this permission, the logic processing unit 30d in the common processing unit 3d performs transfer processing of the packet received by the reception terminal 13 and accumulated in the buffer 31 in cooperation with the individual processing unit 11.

When the queue length determination unit 42 determines that, out of the accumulation amount of the buffer 21, the accumulation amount of packets received by the reception terminal 13 in the buffer 21 is zero (YES in step S326 of FIG. 14), the adaptive control unit 44d permits the buffer 31 to output the packet received by the reception terminal 13 (step S327 of FIG. 14). The adaptive control unit 44d then returns to step S301. The packet transfer processing device 1d thus returns to the state at the time of initialization.

According to the above-described procedure, even when control is performed to cause only one common processing unit to perform the packet transfer processing, shut off power to the other common processing unit, and resume power supply and return to processing by both the common processing units, packet loss or order change does not occur. In this embodiment, when the total sum of the amounts of received packets decreases to an amount processable by one common processing unit, the power consumption of the packet transfer processing device 1d can be reduced.

Sixth Embodiment

Figure 15:
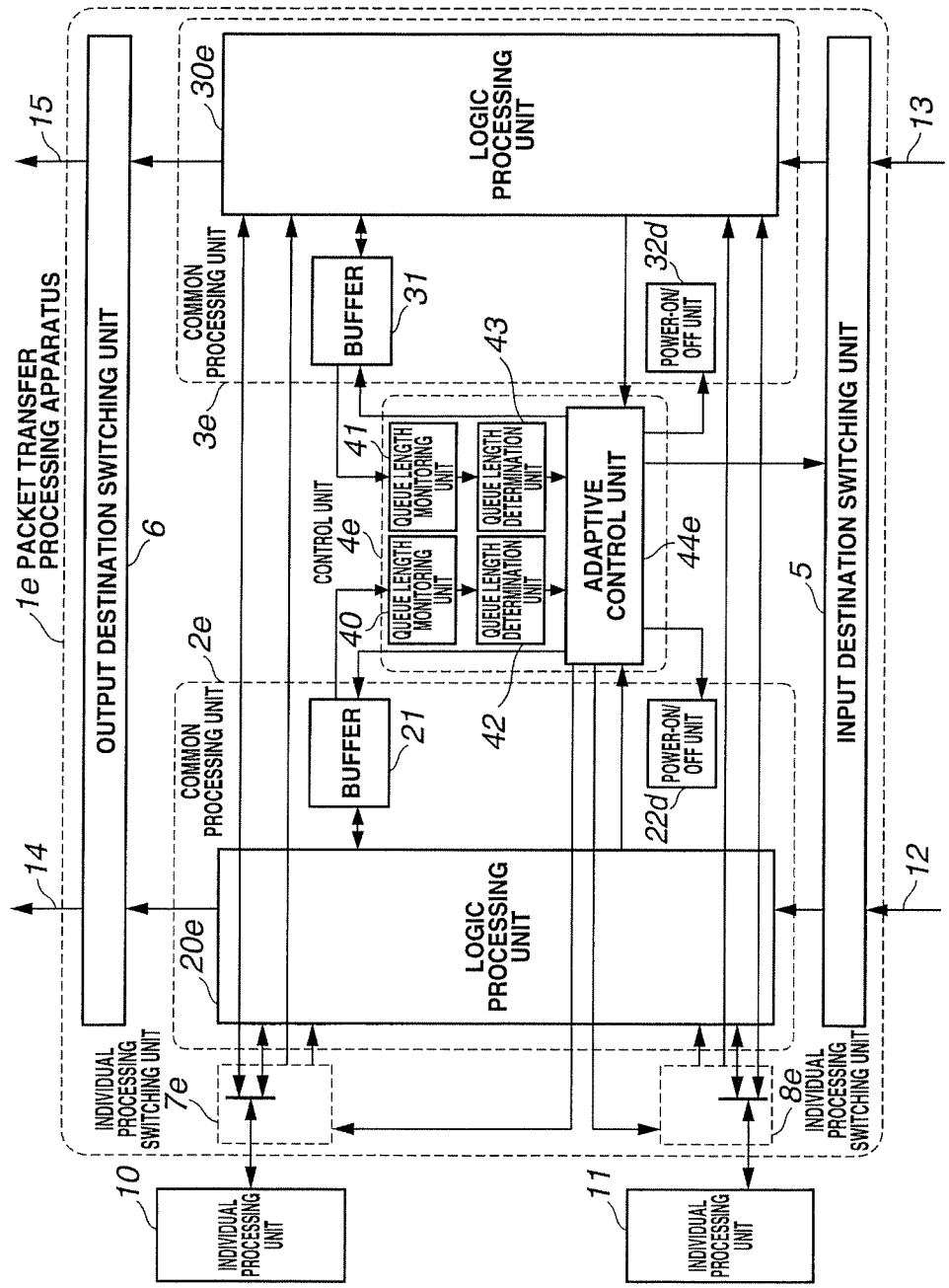
FIG. 15 is a block diagram showing the arrangement of a packet transfer processing device according to the sixth embodiment of the present invention.

The sixth embodiment of the present invention will be described next. FIG. 15 is a block diagram showing the arrangement of a packet transfer processing device according to the sixth embodiment of the present invention.

A packet transfer processing device 1e according to this embodiment includes a common processing unit 2e (first common processing unit), a common processing unit 3e (second common processing unit), a control unit 4e, an input destination switching unit 5, an output destination switching unit 6, an individual processing switching unit 7e (first individual processing switching unit), and an individual processing switching unit 8e (second individual processing switching unit).

The common processing unit 2e includes a logic processing unit 20e (first logic processing unit), a buffer 21 (first buffer), and a power-on/off unit 22d (first power-on/off unit).

The common processing unit 3e includes a logic processing unit 30e (second logic processing unit), a buffer 31 (second buffer), and a power-on/off unit 32d (second power-on/off unit).

The control unit 4e includes a queue length monitoring unit 40 (first queue length monitoring unit), a queue length monitoring unit 41 (second queue length monitoring unit), a queue length determination unit 42 (first queue length determination unit), a queue length determination unit 43 (second queue length determination unit), and an adaptive control unit 44e.

In the second and third embodiments, it is possible to power off the common processing unit 2a or 2b and cause only the common processing unit 3a or 3b to perform packet processing. In this embodiment, however, it is possible to power off the common processing unit 2e and cause only the common processing unit 3e to perform packet processing and also possible to power off the common processing unit 3e and cause only the common processing unit 2e to perform packet processing.

This embodiment is different from the fifth embodiment in the trigger to cause the common processing units to start transfer processing. In the fifth embodiment, when the common processing unit 2d or 3d sends a completion notification of transfer processing performed in cooperation with the external individual processing unit 10 or 11, the control unit 4d changes selection of the individual processing switching unit 7d or 8d and then instructs the newly selected common processing unit to execute transfer processing, and the common processing unit receives the instruction and starts the transfer processing. In this embodiment, however, the control unit 4e causes each common processing unit to start transfer processing when the common processing unit receives a switching completion notification output from the individual processing switching unit 7e or 8e when selection of the individual processing switching unit 7e or 8e is changed.

Figure 16:
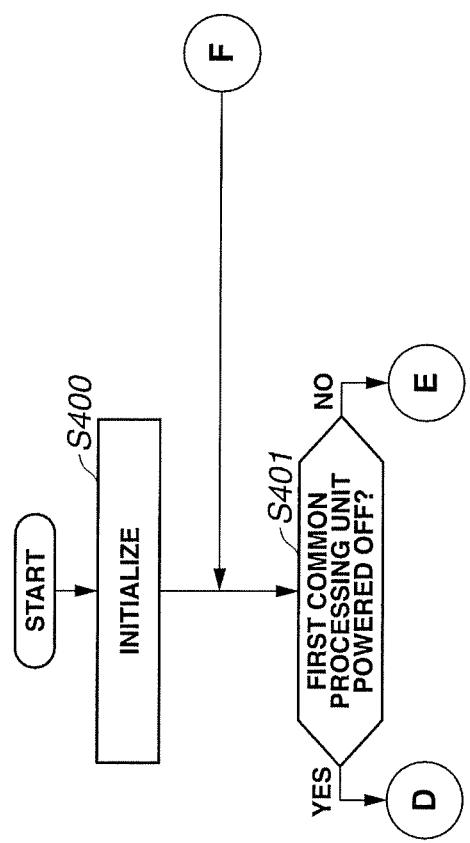
FIG. 16 is a flowchart showing the operation of the packet transfer processing device according to the sixth embodiment of the present invention.

The operation of the packet transfer processing device 1e according to this embodiment will be described next with reference to FIGS. 16 to 18. At the time of initialization (step S400 of FIG. 16), a packet received by a reception terminal 12 is input to the common processing unit 2e via the input destination switching unit 5. The individual processing switching unit 7e selects the common processing unit 2e, connects the common processing unit 2e and an individual processing unit 10, and sends a switching completion notification representing selection to the selected common processing unit 2e and a switching completion notification representing nonselection to the common processing unit 3e. Upon receiving the switching completion notification, the common processing unit 2e performs the packet transfer processing in cooperation with the external individual processing unit 10 via the individual processing switching unit 7e. The packet processed by the common processing unit 2e is transmitted from a transmission terminal 14 via the output destination switching unit 6.

At the time of initialization, a packet received by a reception terminal 13 is input to the common processing unit 3e via the input destination switching unit 5. The individual processing switching unit 8e selects the common processing unit 3e, connects the common processing unit 3e and an individual processing unit 11, and sends a switching completion notification to the selected common processing unit 3e and a switching completion notification representing nonselection to the common processing unit 2e. Upon receiving the switching completion notification, the common processing unit 3e performs the packet transfer processing in cooperation with the external individual processing unit 11 via the individual processing switching unit Be. The packet processed by the common processing unit 3e is transmitted from a transmission terminal 15 via the output destination switching unit 6.

An operation when powering off the common processing unit 2e and causing only the common processing unit 3e to perform packet processing (YES in step S401 of FIG. 16) is performed as follows.

The queue length monitoring unit 40 monitors the accumulation amount of the buffer 21 for each reception terminal that has received a packet. When the queue length determination unit 42 determines that the accumulation amount of the buffer 21, that is, the total sum of the accumulation amount of packets received by the reception terminal 12 in the buffer 21 and the accumulation amount of packets received by the reception terminal 13 in the buffer 21 is larger than a predetermined first threshold, the adaptive control unit 44e in the control unit 4e controls the power-on/off unit 22d in the common processing unit 2e and the power-on/off unit 32d in the common processing unit 3e to turn on the power supply function and supply power to the common processing units 2e and 3e, and also controls the input destination switching unit 5 such that the packet received by the reception terminal 12 is input to the common processing unit 2e, and the packet received by the reception terminal 13 is input to the common processing unit 3e.

When the queue length determination unit 42 determines that the accumulation amount of the buffer 21 is larger than the first threshold, the adaptive control unit 44e controls the individual processing switching unit 7e such that the common processing unit 2e and the external individual processing unit 10 cooperatively perform transfer processing of the packet received by the reception terminal 12 and input from the input destination switching unit 5 to the common processing unit 2e, and also controls the individual processing switching unit 8e such that the common processing unit 3e and the external individual processing unit 11 cooperatively perform transfer processing of the packet received by the reception terminal 13 and input from the input destination switching unit 5 to the common processing unit 3e.

When the queue length determination unit 42 determines that the accumulation amount of the buffer 21 is larger than the first threshold, the adaptive control unit 44e permits the buffer 21 to output the packet received by the reception terminal 12, permits the buffer 31 to output the packet received by the reception terminal 13, prohibits the buffer 21 from outputting the packet received by the reception terminal 13, and prohibits the buffer 31 from outputting the packet received by the reception terminal 12.

The output destination switching unit 6 outputs, out of packets output from the common processing units 2e and 3e, the packet received by the reception terminal 12 and processed by the common processing unit 2e to the transmission terminal 14 and the packet received by the reception terminal 13 and processed by the common processing unit 3e to the transmission terminal 15.

Since the common processing unit 2e is selected, the individual processing switching unit 7e sends the switching completion notification representing nonselection to the unselected common processing unit 3e. Hence, the common processing unit 3e cannot perform transfer processing of the packet received by the reception terminal 12. That is, cooperative processing of the common processing unit 3e and the individual processing unit 10 is prohibited. Additionally, since the common processing unit 3e is selected, the individual processing switching unit 8e sends the switching completion notification representing nonselection to the unselected common processing unit 2e. Hence, the common processing unit 2e cannot perform transfer processing of the packet received by the reception terminal 13. That is, cooperative processing of the common processing unit 2e and the individual processing unit 11 is prohibited.

In this way, when the accumulation amount of the buffer 21 is larger than the first threshold, the operation at the time of initialization continues.

When the traffic volume of packets received by the reception terminal 12 decreases, and the queue length determination unit 42 determines that the accumulation amount of the buffer 21 is equal to or smaller than the first threshold (YES in step S402 of FIG. 17), the adaptive control unit 44e operates as follows depending on whether the accumulation amount of the buffer 31 monitored by the queue length monitoring unit 41, that is, the total sum of the accumulation amount of packets received by the reception terminal 12 in the buffer 31 and the accumulation amount of packets received by the reception terminal 13 in the buffer 31 is determined to be smaller or larger than a predetermined second threshold.

When the queue length determination unit 43 determines that the accumulation amount of the buffer 31 is larger than the predetermined second threshold (NO in step S403 of FIG. 17), the control of the adaptive control unit 44*e* does not change, and the adaptive control unit 44*e* continues the current operation.

Figure 17:
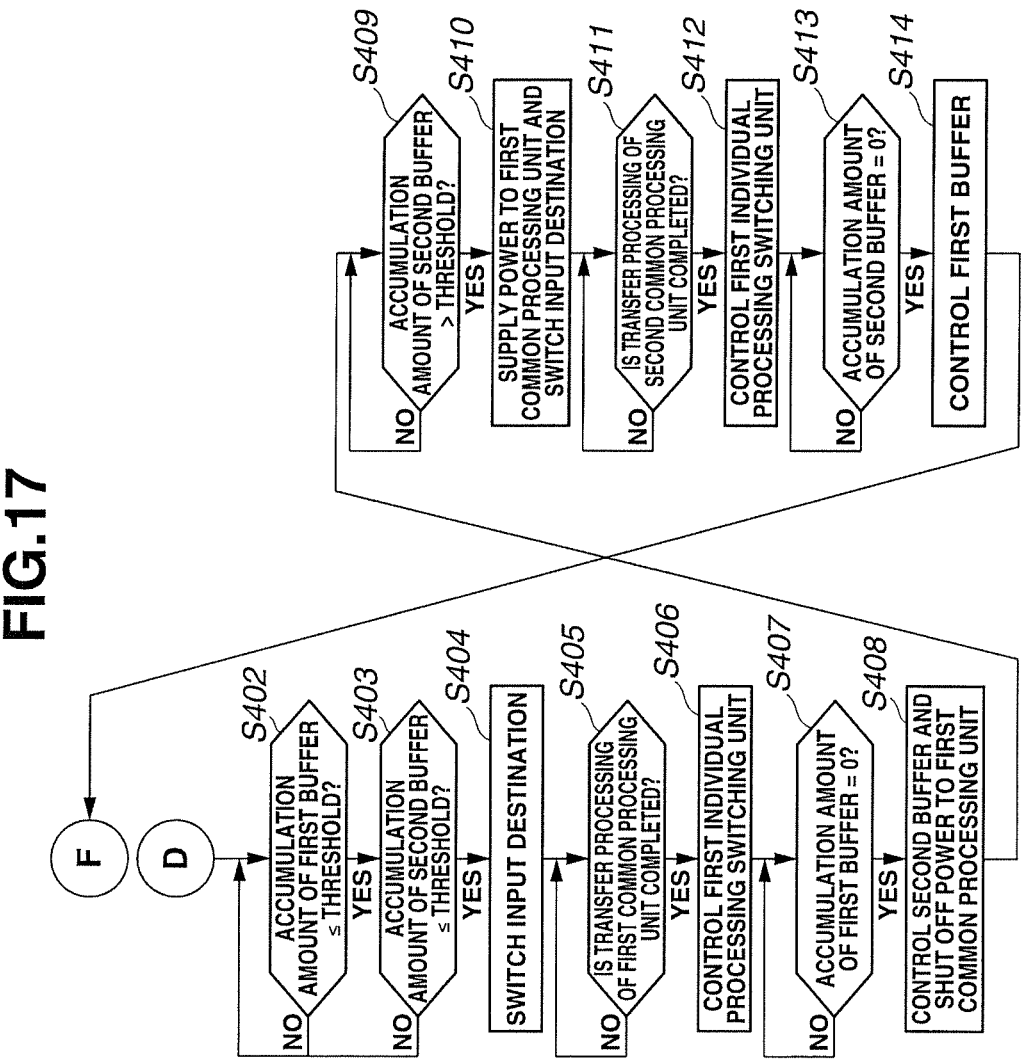
FIG. 17 is a flowchart showing the operation of the packet transfer processing device according to the sixth embodiment of the present invention.

On the other hand, when the queue length determination unit 42 determines that the accumulation amount of the buffer 21 is equal to or smaller than the first threshold, and the queue length determination unit 43 determines that the accumulation amount of the buffer 31 is equal to or smaller than the second threshold (YES in step S403 of FIG. 17), the adaptive control unit 44*e* controls the input destination switching unit 5 to change the packet input destination such that the packet received by the reception terminal 12 is input to the common processing unit 3*e*, and the packet received by the reception terminal 13 is also input to the common processing unit 3*e* (step S404 of FIG. 17). However, the adaptive control unit 44*e* continues control of output prohibition at the time of initialization such that the buffer 31 does not output the packet received by the reception terminal 12.

The common processing unit 3*e* cannot perform transfer processing of the packet received by the reception terminal 12 because the switching completion notification representing selection is not received from the individual processing switching unit 7*e*. That is, prohibition of cooperative processing of the common processing unit 3*e* and the individual processing unit 10 continues.

When the packet input destination is switched, any packet received by the reception terminal 12 is not newly input to the common processing unit 2*e*. For this reason, transfer processing of packets received by the reception terminal 12 and accumulated in the buffer 21 is completed after a while. When the packet transfer processing is completed, the logic processing unit 20*e* in the common processing unit 2*e* notifies the control unit 4*e* of the completion of transfer processing.

When the adaptive control unit 44*e* receives the transfer processing completion notification (YES in step S405 of FIG. 17), the common processing unit 2*e* has already completed transfer processing performed in cooperation with the external individual processing unit 10. Hence, the individual processing unit 10 can be disconnected from the common processing unit 2*e* without any problem. The adaptive control unit 44*e* controls the individual processing switching unit 7*e* such that the common processing unit 3*e* and the external individual processing unit 10 cooperatively perform transfer processing of the packet received by the reception terminal 12 and input from the input destination switching unit 5 to the common processing unit 3*e* (step S406 of FIG. 17).

The individual processing switching unit 7*e* sends a switching completion notification representing selection to the newly selected common processing unit 3*e* and a switching completion notification representing nonselection to the common processing unit 2*e*. Upon receiving the switching completion notification, the logic processing unit 30*e* in the common processing unit 3*e* can perform transfer processing of the packet received by the reception terminal 12 and accumulated in the buffer 31 in cooperation with the individual processing unit 10. Additionally, the logic processing unit 30*e* performs transfer processing of the packet received by the reception terminal 13 and accumulated in the buffer 31 in cooperation with the individual processing unit 11, like at the time of initialization. However, the adaptive control unit 44*e* continues control of output prohibition at the time of initialization such that the buffer 31 does not output the packet received by the reception terminal 12.

When the queue length determination unit 42 determines that the accumulation amount of the buffer 21 is zero (YES in step S407 of FIG. 17), the adaptive control unit 44*e* permits the buffer 31 to output the packet received by the reception terminal 12 (step S408 of FIG. 17). The output destination switching unit 6 outputs, out of the packets output from the common processing unit 3*e*, the packet received by the reception terminal 12 to the transmission terminal 14 and the packet received by the reception terminal 13 to the transmission terminal 15.

Upon determining that the accumulation amount of the buffer 21 is zero, the adaptive control unit 44*e* controls the power-on/off unit 22*d* in the common processing unit 2*e* to turn off the power supply function and shut off power supply to the common processing unit 2*e* (step S408).

When the queue length determination unit 43 determines that the accumulation amount of the buffer 31, that is, the total sum of the amount of packets received by the reception terminal 12 in the buffer 31 and the amount of packets received by the reception terminal 13 in the buffer 31 is larger than the predetermined second threshold (YES in step S409 of FIG. 17), the adaptive control unit 44*e* controls the power-on/off unit 22*d* to turn on the power supply function and supply power to the common processing unit 2*e* (step S410 of FIG. 17).

The adaptive control unit 44*e* controls output prohibition such that the buffer 21 does not output the packet, and also controls the input destination switching unit 5 to change the packet input destination such that the packet received by the reception terminal 12 is input to the common processing unit 2*e*, and the packet received by the reception terminal 13 is input to the common processing unit 3*e* (step S410). At this time, the common processing unit 2*e* cannot perform transfer processing of the packet received by the reception terminal 12 because the switching completion notification representing selection is not received from the individual processing switching unit 7*e*. That is, prohibition of cooperative processing of the common processing unit 2*e* and the individual processing unit 10 continues.

When the packet input destination is switched, any packet received by the reception terminal 12 is not newly input to the common processing unit 3*e*. For this reason, transfer processing of packets received by the reception terminal 12 and accumulated in the buffer 31 is completed after a while. When transfer processing of the packets received by the reception terminal 12 is completed, the logic processing unit 30*e* in the common processing unit 3*e* notifies the control unit 4*e* of the completion of transfer processing.

When the adaptive control unit 44*e* receives the transfer processing completion notification (YES in step S411 of FIG. 17), the common processing unit 3*e* has already completed transfer processing performed in cooperation with the external individual processing unit 10. Hence, the individual processing unit 10 can be disconnected from the common processing unit 3*e* without any problem. The adaptive control unit 44*e* controls the individual processing switching unit 7*e* such that the common processing unit 2*e* and the external individual processing unit 10 cooperatively perform transfer processing of the packet received by the reception terminal 12 and input from the input destination switching unit 5 to the common processing unit 2*e* (step S412 of FIG. 17).

The individual processing switching unit 7*e* sends a switching completion notification representing selection to the newly selected common processing unit 2*e* and a switching completion notification representing nonselection to the common processing unit 3e. Upon receiving the switching completion notification, the logic processing unit 20e in the common processing unit 2e can perform transfer processing of the packet received by the reception terminal 12 and accumulated in the buffer 21 in cooperation with the individual processing unit 10. However, the adaptive control unit 44e continues control of output prohibition such that the buffer 21 does not output the packet received by the reception terminal 12.

When the queue length determination unit 43 determines that, out of the accumulation amount of the buffer 31, the accumulation amount of packets received by the reception terminal 12 in the buffer 31 is zero (YES in step S413 of FIG. 17), the adaptive control unit 44e permits the buffer 21 to output the packet received by the reception terminal 12 (step S414 of FIG. 17). The adaptive control unit 44e then returns to step S401.

The packet transfer processing device 1e thus returns to the state at the time of initialization. More specifically, the common processing unit 2e performs the packet transfer processing in cooperation with the external individual processing unit 10 via the individual processing switching unit 7e. The packet processed by the common processing unit 2e is transmitted from the transmission terminal 14 via the output destination switching unit 6. The packet received by the reception terminal 13 is input to the common processing unit 3e via the input destination switching unit 5. The common processing unit 3e performs the packet transfer processing in cooperation with the external individual processing unit 11 via the individual processing switching unit 8e. The packet processed by the common processing unit 3e is transmitted from the transmission terminal 15 via the output destination switching unit 6. The adaptive control unit 44e controls such that the buffer 31 does not output the packet received by the reception terminal 12.

An operation when powering off the common processing unit 3e and causing only the common processing unit 2e to perform packet processing (NO in step S401 of FIG. 16) will be described next. The operation at the time of initialization is the same as described above.

When the traffic volume of packets received by the reception terminal 13 decreases, and the queue length determination unit 43 determines that the accumulation amount of the buffer 31 is equal to or smaller than the second threshold (YES in step S415 of FIG. 18), the adaptive control unit 44e operates as follows depending on whether the accumulation amount of the buffer 21 monitored by the queue length monitoring unit 40, that is, the total sum of the accumulation amount of packets received by the reception terminal 12 in the buffer 21 and the accumulation amount of packets received by the reception terminal 13 in the buffer 21 is determined to be smaller or larger than the predetermined first threshold.

When the queue length determination unit 42 determines that the accumulation amount of the buffer 21 is larger than the predetermined first threshold (NO in step S416 of FIG. 18), the control of the adaptive control unit 44e does not change, and the adaptive control unit 44e continues the current operation.

Figure 18:
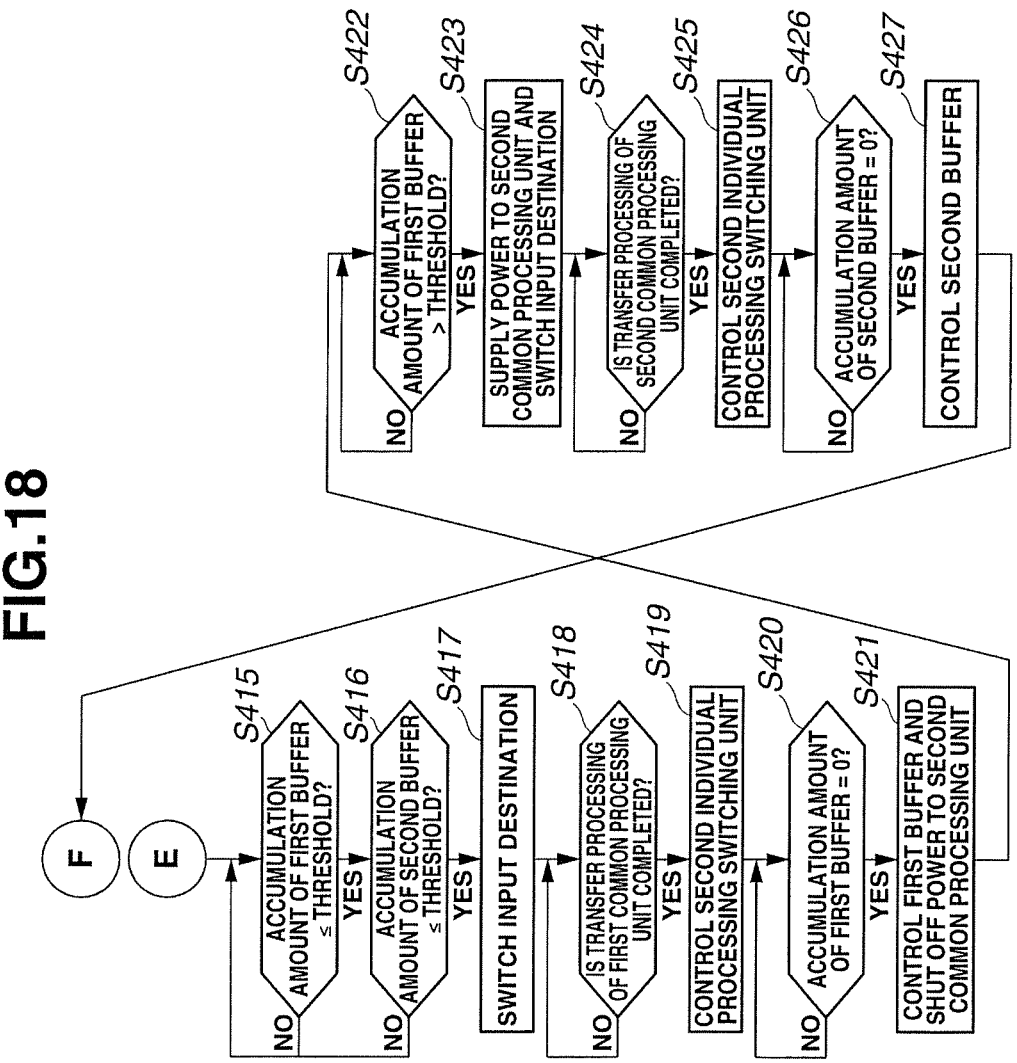
FIG. 18 is a flowchart showing the operation of the packet transfer processing device according to the sixth embodiment of the present invention.
Figure 19:
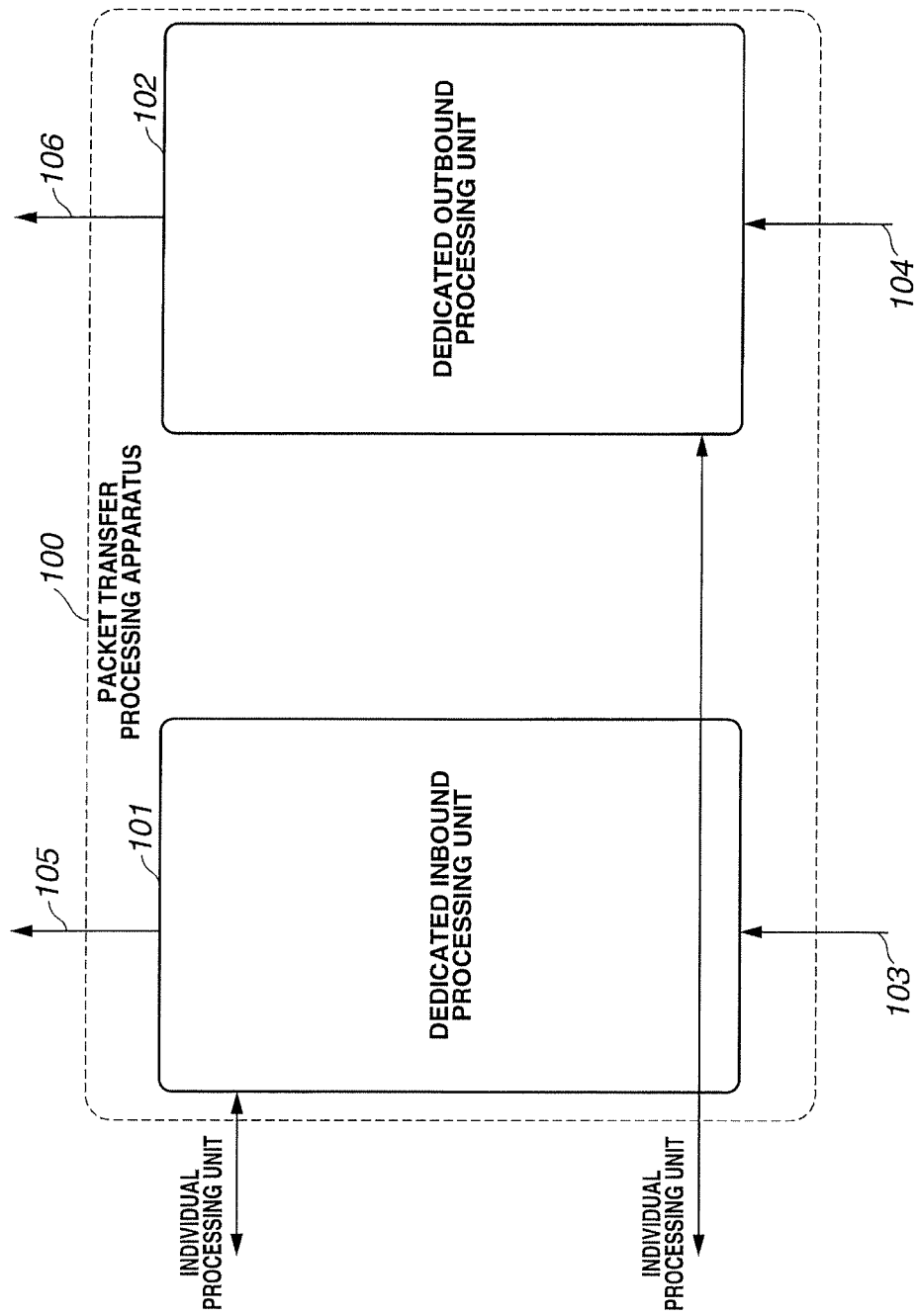
FIG. 19 is a block diagram showing an example of the arrangement of a conventional packet transfer processing device.

On the other hand, when the queue length determination unit 43 determines that the accumulation amount of the buffer 31 is equal to or smaller than the second threshold (YES in step S415 of FIG. 18), and the queue length determination unit 42 determines that the accumulation amount of the buffer 21 is equal to or smaller than the first threshold (YES in step S416 of FIG. 18), the adaptive control unit 44e controls the input destination switching unit 5 to change the packet input destination such that the packet received by the reception terminal 12 is input to the common processing unit 2e, and the packet received by the reception terminal 13 is also input to the common processing unit 2e (step S417 of FIG. 18). However, the adaptive control unit 44e continues control of output prohibition at the time of initialization such that the buffer 21 does not output the packet received by the reception terminal 13.

The common processing unit 2e cannot perform transfer processing of the packet received by the reception terminal 13 because the switching completion notification representing selection is not received from the individual processing switching unit 8e. That is, prohibition of cooperative processing of the common processing unit 2e and the individual processing unit 11 continues.

When the packet input destination is switched, any packet received by the reception terminal 13 is not newly input to the common processing unit 3e. For this reason, transfer processing of packets received by the reception terminal 13 and accumulated in the buffer 31 is completed after a while. When the packet transfer processing is completed, the logic processing unit 30e in the common processing unit 3e notifies the adaptive control unit 44e of the completion of transfer processing.

When the adaptive control unit 44e receives the transfer processing completion notification (YES in step S418 of FIG. 18), the common processing unit 3e has already completed transfer processing performed in cooperation with the external individual processing unit 11. Hence, the individual processing unit 11 can be disconnected from the common processing unit 3e without any problem. The adaptive control unit 44e controls the individual processing switching unit 8e such that the common processing unit 2e and the external individual processing unit 11 cooperatively perform transfer processing of the packet received by the reception terminal 13 and input from the input destination switching unit 5 to the common processing unit 2e (step S419 of FIG. 18).

The individual processing switching unit 8e sends a switching completion notification representing selection to the newly selected common processing unit 2e and a switching completion notification representing nonselection to the common processing unit 3e. Upon receiving the switching completion notification, the logic processing unit 20e in the common processing unit 2e can perform transfer processing of the packet received by the reception terminal 13 and accumulated in the buffer 21 in cooperation with the individual processing unit 11. Additionally, the logic processing unit 20e performs transfer processing of the packet received by the reception terminal 12 and accumulated in the buffer 21 in cooperation with the individual processing unit 10, like at the time of initialization. However, the adaptive control unit 44e continues control of output prohibition at the time of initialization such that the buffer 21 does not output the packet received by the reception terminal 13.

When the queue length determination unit 43 determines that the accumulation amount of the buffer 31 is zero (YES in step S420 of FIG. 18), the adaptive control unit 44e permits the buffer 21 to output the packet received by the reception terminal 13 (step S421 of FIG. 18). The output destination switching unit 6 outputs, out of the packets output from the common processing unit 2e, the packet received by the reception terminal 12 to the transmission terminal 14 and the packet received by the reception terminal 13 to the transmission terminal 15.

Upon determining that the accumulation amount of the buffer 31 is zero, the adaptive control unit 44e controls the power-on/off unit 32d in the common processing unit 3e to turn off the power supply function and shut off power supply to the common processing unit 3e (step S421).

When the queue length determination unit 42 determines that the accumulation amount of the buffer 21, that is, the total sum of the amount of packets received by the reception terminal 12 in the buffer 21 and the amount of packets received by the reception terminal 13 in the buffer 21 is larger than the predetermined first threshold (YES in step S422 of FIG. 18), the adaptive control unit 44e controls the power-on/off unit 32d to turn on the power supply function and supply power to the common processing unit 3e (step S423 of FIG. 18).

The adaptive control unit 44e controls output prohibition such that the buffer 31 does not output the packet, and also controls the input destination switching unit 5 to change the packet input destination such that the packet received by the reception terminal 12 is input to the common processing unit 2e, and the packet received by the reception terminal 13 is input to the common processing unit 3e (step S423). At this time, the common processing unit 3e cannot perform transfer processing of the packet received by the reception terminal 13 because the switching completion notification representing selection is not received from the individual processing switching unit 8e. That is, prohibition of cooperative processing of the common processing unit 3e and the individual processing unit 11 continues.

When the packet input destination is switched, any packet received by the reception terminal 13 is not newly input to the common processing unit 2e. For this reason, transfer processing of packets received by the reception terminal 13 and accumulated in the buffer 21 is completed after a while. When transfer processing of the packets received by the reception terminal 13 is completed, the logic processing unit 20e in the common processing unit 2e notifies the control unit 4e of the completion of transfer processing.

When the adaptive control unit 44e receives the transfer processing completion notification (YES in step S424 of FIG. 18), the common processing unit 2e has already completed transfer processing performed in cooperation with the external individual processing unit 11. Hence, the individual processing unit 11 can be disconnected from the common processing unit 2e without any problem. The adaptive control unit 44e controls the individual processing switching unit 8e such that the common processing unit 3e and the external individual processing unit 11 cooperatively perform transfer processing of the packet received by the reception terminal 13 and input from the input destination switching unit 5 to the common processing unit 3e (step S425 of FIG. 18).

The individual processing switching unit 8e sends a switching completion notification representing selection to the newly selected common processing unit 3e and a switching completion notification representing nonselection to the common processing unit 2e. Upon receiving the switching completion notification, the logic processing unit 30e in the common processing unit 3e can perform transfer processing of the packet received by the reception terminal 13 and accumulated in the buffer 31 in cooperation with the individual processing unit 11. However, the adaptive control unit 44e continues control of output prohibition such that the buffer 31 does not output the packet received by the reception terminal 13.

When the queue length determination unit 42 determines that, out of the accumulation amount of the buffer 21, the accumulation amount of packets received by the reception terminal 13 in the buffer 21 is zero (YES in step S426 of FIG. 18), the adaptive control unit 44e permits the buffer 31 to output the packet received by the reception terminal 13 (step S427 of FIG. 18). The adaptive control unit 44e then returns to step S401. The packet transfer processing device 1e thus returns to the state at the time of initialization.

According to the above-described procedure, even when control is performed to cause only one common processing unit to perform the packet transfer processing, shut off power to the other common processing unit, and resume power supply and return to processing by both the common processing units, packet loss or order change does not occur. In this embodiment, when the total sum of the amounts of received packets decreases to an amount processable by one common processing unit, the power consumption of the packet transfer processing device 1e can be reduced.

In the fourth, fifth, and sixth embodiments, whether to cause only the common processing unit 2c, 2d, or 2e to perform packet processing or cause only the common processing unit 3c, 3d, or 3e to perform packet processing can be decided by the processing capabilities of the common processing units 2c, 2d, and 2e and the common processing units 3c, 3d, and 3e when, for example, the traffic volumes processable by the common processing units 2c, 2d, and 2e and the common processing units 3c, 3d, and 3e are different.

When the packet transfer processing device is formed from a semiconductor integrated circuit, the following effects can be obtained according to the fourth, fifth, and sixth embodiments. A phenomenon that is problematic in terms of reliability of a microfabricated semiconductor integrated circuit is a degradation phenomenon NBTI (Negative Bias Temperature Instability) of a P-MOSFET in negative bias stress. The degradation of the P-MOSFET is known to recover upon non-energization. When the common processing unit that performs processing is appropriately switched, and the common processing units 2c, 2d, and 2e and the common processing units 3c, 3d, and 3e are alternately powered off, as in the fourth, fifth, and sixth embodiments, the characteristic degradation of the P-MOSFET can be recovered, and the trouble-free period of the packet transfer processing device can be prolonged. It is therefore possible to obtain the effect of raising the reliability.

In the second, third, fifth, and sixth embodiments, the buffers 21 and 31 need not always have the same accumulation capacity, which may appropriately be decided in accordance with the processing capabilities of the common processing units 2a, 2b, 2d, and 2e and the common processing units 3a, 3b, 3d, and 3e, and the like.

When the packet transfer processing device is formed from a semiconductor integrated circuit, the buffers 21 and 31 can be either incorporated in the semiconductor chip or provided outside the semiconductor chip. Alternatively, one of the buffers 21 and 31 may be incorporated in the semiconductor chip, and the other may be provided outside the semiconductor chip.

A design example when the packet transfer processing device is formed from a semiconductor integrated circuit will be described here. An arrangement can be considered in which the processing capability of the common processing unit 3, 3a, 3b, 3c, 3d, or 3e is higher than that of the common processing unit 2, 2a, 2b, 2c, 2d, or 2e, the accumulation capacity of the buffer 31 is larger than that of the buffer 21 (the second threshold is larger than the first threshold), the buffer 21 is incorporated in the semiconductor chip, and the buffer 31 is connected outside the semiconductor chip.

When this arrangement is employed in the fourth, fifth, and sixth embodiments, and the packet transfer processing device is applied to a portion where the traffic volume of packets to be received is low, packet processing in both inbound processing and outbound processing can be performed by only the common processing unit 2c, 2d, or 2e in an arrangement using only one semiconductor chip. When the packet transfer processing device is applied to a portion where the traffic volume of packets to be received is high, packet processing in both inbound processing and outbound processing can be performed by both the common processing unit 2c, 2d, or 2e and the common processing unit 3c, 3d, or 3e in an arrangement that provides the buffer 31 outside the semiconductor chip. As the processing target packet accumulation buffer to be externally attached, a buffer having a necessary capacity can be selected in accordance with the traffic volume. As described above, according to the packet transfer processing device of the present invention, it is possible to obtain the effect of implementing a minimum part arrangement and also expanding the arrangement in accordance with the condition of the portion to which the device is applied.

In the first, second, and third embodiments, the following methods are available as the method of sharing inbound processing and outbound processing. As one method, the common processing unit 2, 2a, or 2b capable of being powered off performs inbound processing, and the common processing unit 3, 3a, and 3b performs outbound processing. When the traffic volume is low, the common processing unit 3, 3a, and 3b performs both inbound processing and outbound processing. As another method, the common processing unit 2, 2a, or 2b capable of being powered off performs outbound processing, and the common processing unit 3, 3a, and 3b performs inbound processing. When the traffic volume is low, the common processing unit 3, 3a, and 3b performs both inbound processing and outbound processing. Which sharing method is to be selected can appropriately be decided in accordance with the condition of the processing amounts of inbound processing and outbound, processing.

In the first, second, third, fourth, fifth, and sixth embodiments, setup and control of the packet transfer processing device according to the traffic volume can be done automatically or appropriately by an operator.

The packet transfer processing devices 1, 1a, 1b, 1c, 1d, and 1e according to the first, second, third, fourth, fifth, and sixth embodiments need not always be implemented by hardware. For example, the packet transfer processing devices 1, 1a, 1b, 1c, 1d, and 1e can be implemented by a computer including a CPU, storage device, and interface and a program that controls these hardware resources. The CPU executes the processing described in the first, second, third, fourth, fifth, and sixth embodiments in accordance with the program stored in the storage device.

The individual processing units 10 and 11 according to the first, second, third, fourth, fifth, and sixth embodiments can be implemented by either hardware or a computer. The CPU of the computer that constitutes the individual processing units 10 and 11 executes the processing described in the first, second, third, fourth, fifth, and sixth embodiments in accordance with a program stored in the storage device of the computer. In the first, second, third, fourth, fifth, and sixth embodiments, the individual processing units 10 and 11 are provided outside the packet transfer processing devices 1, 1a, 1b, 1c, 1d, and 1e. However, the individual processing units 10 and 11 may be provided inside the packet transfer processing devices 1, 1a, 1b, 1c, 1d, and 1e.

Some or all of the above-described embodiments can also be described as in the following supplementary notes but are not limited to the followings.

(Supplementary Note 1) There is provided a packet transfer processing method comprising the input destination switching step of selecting one of a plurality of common processing units that perform processing sharable in first transfer processing that receives a packet from a first network and transfers the packet to a second network and second transfer processing that receives a packet from the second network and transfers the packet to the first network, to which the packets received from the first network and the second network are to be input, the common processing step of causing the plurality of common processing units to perform the processing sharable in the first transfer processing and the second transfer processing, the output destination switching step of outputting the packet processed in the common processing step to a network of a transfer destination, the individual processing switching step of selecting which common processing unit is to be connected to an individual processing unit that performs at least one of first individual processing nonsharable by the common processing units out of the first transfer processing and second individual processing nonsharable by the common processing units out of the second transfer processing, and the control step of performing selection control in the input destination switching step, selection control in the individual processing switching step, and control of switching supply/shutoff of power to the common processing units.

(Supplementary Note 2) There is provided the packet transfer processing method according to supplementary note 1, wherein the common processing step comprises the first common processing step of causing a first common processing unit out of the two common processing units to perform the first transfer processing in cooperation with a first individual processing unit that performs the first individual processing when power necessary for an operation of the first common processing unit is on, and the second common processing step of causing a second common processing unit out of the two common processing units to perform the second transfer processing in cooperation with a second individual processing unit that performs the second individual processing when the power of the first common processing unit is on and perform the first transfer processing in cooperation with the first individual processing unit and the second transfer processing in cooperation with the second individual processing unit when the power of the first common processing unit is off, the control step comprises the steps of turning on the power of the first common processing unit when causing the first common processing unit to perform the first transfer processing and causing the second common processing unit to perform the second transfer processing, and turning off the power of the first common processing unit when causing the second common processing unit to perform both the first transfer processing and the second transfer processing, controlling selection in the input destination switching step such that when the power of the first common processing unit is on, the packet received from the first network is input to the first common processing unit, and the packet received from the second network is input to the second common processing unit, and when the power of the first common processing unit is off, the packets received from the first network and the second network are input to the second common processing unit, and controlling selection in the individual processing switching step such that when the power of the first common processing unit is on, the first common processing unit is connected to the first individual processing unit, and when the power of the first common processing unit is off, the second common processing unit is connected to the first individual processing unit, and the output destination switching step comprises the step of outputting the packet received from the first network to the second network and outputting the packet received from the second network to the first network.

(Supplementary Note 3) There is provided the packet transfer processing method according to supplementary note 2, wherein the first common processing step comprises the first logic processing step of, when the power of the first common processing unit is on, performing the first transfer processing in cooperation with the first individual processing unit for the packets accumulated in a first buffer in the first common processing unit, the second common processing step comprises the second logic processing step of, when the power of the first common processing unit is on, performing the second transfer processing in cooperation with the second individual processing unit for the packets accumulated in a second buffer in the second common processing unit, and when the power of the first common processing unit is off, performing the first transfer processing in cooperation with the first individual processing unit and the second transfer processing in cooperation with the second individual processing unit for the packets accumulated in the second buffer, the control step comprises the first queue length determination step of comparing an accumulation amount of the packets accumulated in the first buffer with a predetermined first threshold, the second queue length determination step of comparing an accumulation amount of the packets accumulated in the second buffer with a predetermined second threshold, and the adaptive control step of performing, based on comparison results in the first queue length determination step and the second queue length determination step, selection control in the input destination switching step, selection control in the individual processing switching step, power on/off control of the first common processing unit, and common processing control of instructing one of permission and prohibition of the first transfer processing in the first logic processing step and the second logic processing step, and the first logic processing step and the second logic processing step comprise the step of notifying the adaptive control step of transfer completion when the first transfer processing is completed.

(Supplementary Note 4) There is provided the packet transfer processing method according to supplementary note 2, wherein the first common processing step comprises the first logic processing step of, when the power of the first common processing unit is on, performing the first transfer processing in cooperation with the first individual processing unit for the packets accumulated in a first buffer in the first common processing unit, the second common processing step comprises the second logic processing step of, when the power of the first common processing unit is on, performing the second transfer processing in cooperation with the second individual processing unit for the packets accumulated in a second buffer in the second common processing unit, and when the power of the first common processing unit is off, performing the first transfer processing in cooperation with the first individual processing unit and the second transfer processing in cooperation with the second individual processing unit for the packets accumulated in the second buffer, the control step comprises the first queue length determination step of comparing an accumulation amount of the packets accumulated in the first buffer with a predetermined first threshold, the second queue length determination step of comparing an accumulation amount of the packets accumulated in the second buffer with a predetermined second threshold, and the adaptive control step of performing, based on comparison results in the first queue length determination step and the second queue length determination step, selection control in the input destination switching step, selection control in the individual processing switching step, and power on/off control of the first common processing unit, the individual processing switching step comprises the step of sending a switching completion notification to the selected common processing unit out of the first common processing unit and the second common processing unit, the first logic processing step comprises the steps of executing the first transfer processing in cooperation with the first individual processing unit only during a period when the first common pressing unit is selected in the individual processing switching step and notifying an adaptive control unit that performs the selection control in the individual processing switching step of transfer completion when the first transfer processing is completed, and the second logic processing step comprises the step of executing the first transfer processing in cooperation with the first individual processing unit only during a period when the second common processing unit is selected in the individual processing switching step and not the adaptive control unit of transfer completion when the first transfer processing is completed.

(Supplementary Note 5) There is provided the packet transfer processing method according to supplementary note 1, wherein the individual processing switching step comprises the first individual processing switching step of connecting a first individual processing unit that performs the first individual processing to one of the plurality of common processing units, and the second individual processing switching step of connecting a second individual processing unit that performs the second individual processing to one of the plurality of common processing units, the common processing step comprises the first common processing step of causing a first common processing unit out of the two common processing units to perform the first transfer processing in cooperation with the first individual processing unit when power necessary for an operation of the first common processing unit is on, and perform the first transfer processing in cooperation with the first individual processing unit and the second transfer processing in cooperation with the second individual processing unit when the power of the first common processing unit is on, and the power of a second common processing unit out of the two common processing units is off, and the second common processing step of causing the second common processing unit out of the two common processing units to perform the second transfer processing in cooperation with the second individual processing unit when the power necessary for the operation of the second common processing unit is on, and perform the first transfer processing in cooperation with the first individual processing unit and the second transfer processing in cooperation with the second individual processing unit when the power of the second common processing unit is on, and the power of the first common processing unit is off, the control step comprises the steps of turning on the powers of the first common processing unit and the second common processing unit when causing the first common processing unit to perform the first transfer processing and causing the second common processing unit to perform the second transfer processing, turning on the power of the first common processing unit and turning off the power of the second common processing unit when causing the first common processing unit to perform both the first transfer processing and the second transfer processing, and turning on the power of the second common processing unit and turning off the power of the first common processing unit when causing the second common processing unit to perform both the first transfer processing and the second transfer processing, controlling selection in the input destination switching step such that when the powers of the first common processing unit and the second common processing unit are on, the packet received from the first network is input to the first common processing unit, and the packet received from the second network is input to the second common processing unit, when the power of the first common processing unit is on, and the power of the second common processing unit is off, the packets received from the first network and the second network are input to the first common processing unit, and when the power of the first common processing unit is off, and the power of the second common processing unit is on, the packets received from the first network and the second network are input to the second common processing unit, and controlling selection in the first individual processing switching step and the second individual processing switching step such that when the powers of the first common processing unit and the second common processing unit are on, the first common processing unit is connected to the first individual processing unit, and the second common processing unit is connected to the second individual processing unit, when the power of the first common processing unit is on, and the power of the second common processing unit is off, the first common processing unit is connected to the first individual processing unit and the second individual processing unit, and when the power of the first common processing unit is off, and the power of the second common processing unit is on, the second common processing unit is connected to the first individual processing unit and the second individual processing unit, and the output destination switching step comprises the step of outputting the packet received from the first network to the second network and outputting the packet received from the second network to the first network.

(Supplementary Note 6) There is provided the packet transfer processing method according to supplementary note 5, wherein the first common processing step comprises the first logic processing step of, when the power of the first common processing unit is on, and the power of the second common processing unit is on, performing the first transfer processing in cooperation with the first individual processing unit for the packets accumulated in a first buffer in the first common processing unit, and when the power of the first common processing unit is on, and the power of the second common processing unit is off, performing the first transfer processing in cooperation with the first individual processing unit and the second transfer processing in cooperation with the second individual processing unit for the packets accumulated in the first buffer, the second common processing step comprises the second logic processing step of, when the power of the second common processing unit is on, and the power of the first common processing unit is on, performing the second transfer processing in cooperation with the second individual processing unit for the packets accumulated in a second buffer in the second common processing unit, and when the power of the second common processing unit is on, and the power of the first common processing unit is off, performing the first transfer processing in cooperation with the first individual processing unit and the second transfer processing in cooperation with the second individual processing unit for the packets accumulated in the second buffer, the control step comprises the first queue length determination step of comparing an accumulation amount of the packets accumulated in the first buffer with a predetermined first threshold, the second queue length determination step of comparing an accumulation amount of the packets accumulated in the second buffer with a predetermined second threshold, and the adaptive control step of performing, based on comparison results in the first queue length determination step and the second queue length determination step, selection control in the input destination switching step, selection control in the first individual processing switching step and the second individual processing switching step, power on/off control of the first common processing unit and the second common processing unit, and common processing control of instructing one of permission and prohibition of the first transfer processing and the second transfer processing in the first logic processing step and the second logic processing step, the first logic processing step comprises the step of notifying the adaptive control step of transfer completion when the powers of the first common processing unit and the second common processing unit are on, and the first transfer processing is completed, and notifying the adaptive control step of transfer completion when the second transfer processing is completed after the power of the second common processing unit is switched from off to on, and the second logic processing step comprises the step of notifying the adaptive control step of transfer completion when the powers of the first common processing unit and the second common processing unit are on, and the second transfer processing is completed, and notifying the adaptive control step of transfer completion when the first transfer processing is completed after the power of the first common processing unit is switched from off to on.

(Supplementary Note 7) There is provided the packet transfer processing method according to supplementary note 5, wherein the first common processing step comprises the first logic processing step of, when the power of the first common processing unit is on, and the power of the second common processing unit is on, performing the first transfer processing in cooperation with the first individual processing unit for the packets accumulated in a first buffer in the first common processing unit, and when the power of the first common processing unit is on, and the power of the second common processing unit is off, performing the first transfer processing in cooperation with the first individual processing unit and the second transfer processing in cooperation with the second individual processing unit for the packets accumulated in the first buffer, the second common processing step comprises the second logic processing step of, when the power of the second common processing unit is on, and the power of the first common processing unit is on, performing the second transfer processing in cooperation with the second individual processing unit for the packets accumulated in a second buffer in the second common processing unit, and when the power of the second common processing unit is on, and the power of the first common processing unit is off, performing the first transfer processing in cooperation with the first individual processing unit and the second transfer processing in cooperation with the second individual processing unit for the packets accumulated in the second buffer, the control step comprises the first queue length determination step of comparing an accumulation amount of the packets accumulated in the first buffer with a predetermined first threshold, the second queue length determination step of comparing an accumulation amount of the packets accumulated in the second buffer with a predetermined second threshold, and the adaptive control step of performing, based on comparison results in the first queue length determination step and the second queue length determination step, selection control in the input destination switching step, selection control in the first individual processing switching step and the second individual processing switching step, and power on/off control of the first common processing unit and the second common processing unit, the first individual processing switching step and the second individual processing switching step comprise the step of sending a switching completion notification to the selected common processing unit out of the first common processing unit and the second common processing unit, the first logic processing step comprises the steps of executing the first transfer processing in cooperation with the first individual processing unit only during a period when the first common processing unit and is selected in the first individual processing switching step and notifying an adaptive control unit that controls selection in the first individual processing switching step and the second individual processing switching step of transfer completion when the first transfer processing is completed, and executing the second transfer processing in cooperation with the second individual processing unit only during a period when the first common processing unit is selected in the second individual processing switching step and notifying the adaptive control unit of transfer completion when the second transfer processing is completed, and the second logic processing step comprises the steps of executing the first transfer process in cooperation with the first individual processing unit only during a period when the second common processing unit is selected in the first individual processing switching step and notifying the adaptive control unit of transfer completion when the first transfer processing is completed, and executing the second transfer processing in cooperation with the second individual processing unit only during a period when the second common processing unit is selected in the second individual processing switching step and notifying the adaptive control unit of transfer completion when the second transfer processing is completed.

(Supplementary Note 8) There is provided a packet transfer processing device comprising a plurality of common processing units that perform processing sharable in first transfer processing that receives a packet from a first network and transfers the packet to a second network and second transfer processing that receives a packet from the second network and transfers the packet to the first network, an input destination switching unit that selects a common processing unit to which the packets received from the first network and the second network are to be input, an output destination switching unit that outputs the packet processed by the common processing unit to a network of a transfer destination, an individual processing switching unit that selects which common processing unit is to be connected to an individual processing unit that performs at least one of first individual processing nonsharable by the common processing units out of the first transfer processing and second individual processing nonsharable by the common processing units out of the second transfer processing, and a control unit that performs control of the input destination switching unit, control of the individual processing switching unit, and control of switching supply/shutoff of power to the common processing units.

(Supplementary Note 9) There is provided the packet transfer processing device according to supplementary note 8, wherein the common processing unit comprises two common processing units, a first common processing unit out of the two common processing units performs the first transfer processing in cooperation with a first individual processing unit that performs the first individual processing via the individual processing switching unit when power necessary for an operation of the first common processing unit is on, a second common processing unit out of the two common processing units performs the second transfer processing in cooperation with a second individual processing unit that performs the second individual processing when the power of the first common processing unit is on and performs the first transfer processing in cooperation with the first individual processing unit and the second transfer processing in cooperation with the second individual processing unit via the individual processing switching unit when the power of the first common processing unit is off, the control unit turns on the power of the first common processing unit when causing the first common processing unit to perform the first transfer processing and causing the second common processing unit to perform the second transfer processing, turns off the power of the first common processing unit when causing the second common processing unit to perform both the first transfer processing and the second transfer processing, controls the input destination switching unit such that when the power of the first common processing unit is on, the packet received from the first network is input to the first common processing unit, and the packet received from the second network is input to the second common processing unit, and when the power of the first common processing unit is off, the packets received from the first network and the second network are input to the second common processing unit, and controls the individual processing switching unit such that when the power of the first common processing unit is on, the first common processing unit is connected to the first individual processing unit, and when the power of the first common processing unit is off, the second common processing unit is connected to the first individual processing unit, and the output destination switching unit outputs the packet received from the first network to the second network and outputs the packet received from the second network to the first network.

(Supplementary Note 10) There is provided the packet transfer processing device according to supplementary note 9, wherein the first common processing unit comprises a first buffer that accumulates the packets input from the input destination switching unit, and a first logic processing unit that, when the power necessary for the operation of the first common processing unit is on, performs the first transfer processing in cooperation with the first individual processing unit for the packets accumulated in the first buffer, the second common processing unit comprises a second buffer that accumulates the packets input from the input destination switching unit, and a second logic processing unit that, when the power of the first common processing unit is on, performs the second transfer processing in cooperation with the second individual processing unit for the packets accumulated in the second buffer, and when the power of the first common processing unit is off, performs the first transfer processing in cooperation with the first individual processing unit and the second transfer processing in cooperation with the second individual processing unit for the packets accumulated in the second buffer, the control unit comprises a first queue length determination unit that compares an accumulation amount of the packets accumulated in the first buffer with a predetermined first threshold, a second queue length determination unit that compares an accumulation amount of the packets accumulated in the second buffer with a predetermined second threshold, and an adaptive control unit that performs, based on comparison results of the first queue length determination unit and the second queue length determination unit, control of the input destination switching unit, control of the individual processing switching unit, power on/off control of the first common processing unit, and common processing control of instructing the first logic processing unit and the second logic processing unit to permit or prohibit the first transfer processing, and the first logic processing unit and the second logic processing unit notify the adaptive control unit of transfer completion when the first transfer processing is completed.

(Supplementary Note 11) There is provided the packet transfer processing device according to supplementary note 9, wherein the first common processing unit comprises a first buffer that accumulates the packets input from the input destination switching unit, and a first logic processing unit that, when the power necessary for the operation of the first common processing unit is on, performs the first transfer processing in cooperation with the first individual processing unit for the packets accumulated in the first buffer, the second common processing unit comprises a second buffer that accumulates the packets input from the input destination switching unit, and a second logic processing unit that, when the power of the first common processing unit is on, performs the second transfer processing in cooperation with the second individual processing unit for the packets accumulated in the second buffer, and when the power of the first common processing unit is off, performs the first transfer processing in cooperation with the first individual processing unit and the second transfer processing in cooperation with the second individual processing unit for the packets accumulated in the second buffer, the control unit comprises a first queue length determination unit that compares an accumulation amount of the packets accumulated in the first buffer with a predetermined first threshold, a second queue length determination unit that compares an accumulation amount of the packets accumulated in the second buffer with a predetermined second threshold, and an adaptive control unit that performs, based on comparison results of the first queue length determination unit and the second queue length determination unit, control of the input destination switching unit, control of the individual processing switching unit, and power on/off control of the first common processing unit, the individual processing switching unit has a function of sending a switching completion notification to the selected common processing unit out of the first common processing unit and the second common processing unit, the first logic processing unit executes the first transfer processing in cooperation with the first individual processing unit only during a period when the first common processing unit is selected by the individual processing switching unit and notifies the adaptive control unit of transfer completion when the first transfer processing is completed, and the second logic processing unit executes the first transfer processing in cooperation with the first individual processing unit only during a period when the second common processing unit is selected by the individual processing switching unit and notifies the adaptive control unit of transfer completion when the first transfer processing is completed.

(Supplementary Note 12) There is provided the packet transfer processing device according to supplementary note 8, wherein the common processing unit comprises two common processing units, the individual processing switching unit comprises two individual processing switching units including a first individual processing switching unit that connects a first individual processing unit that performs the first individual processing to one of the plurality of common processing units and a second individual processing switching unit that connects a second individual processing unit that performs the second individual processing to one of the plurality of common processing units, a first common processing unit out of the two common processing units performs the first transfer processing in cooperation with the first individual processing unit via the first individual processing switching unit when power necessary for an operation of the first common processing unit is on, and performs the first transfer processing in cooperation with the first individual processing unit via the first individual processing switching unit and the second transfer processing in cooperation with the second individual processing unit via the second individual processing switching unit when the power of the first common processing unit is on, and the power of a second common processing unit out of the two common processing units is off, the second common processing unit out of the two common processing units performs the second transfer processing in cooperation with the second individual processing unit via the second individual processing switching unit when the power necessary for the operation of the second common processing unit is on, and performs the first transfer processing in cooperation with the first individual processing unit via the first individual processing switching unit and the second transfer processing in cooperation with the second individual processing unit via the second individual processing switching unit when the power of the second common processing unit is on, and the power of the first common processing unit is off, the control unit turns on the powers of the first common processing unit and the second common processing unit when causing the first common processing unit to perform the first transfer processing and causing the second common processing unit to perform the second transfer processing, turns on the power of the first common processing unit and turns off the power of the second common processing unit when causing the first common processing unit to perform both the first transfer processing and the second transfer processing, and turns on the power of the second common processing unit and turns off the power of the first common processing unit when causing the second common processing unit to perform both the first transfer processing and the second transfer processing, controls the input destination switching unit such that when the powers of the first common processing unit and the second common processing unit are on, the packet received from the first network is input to the first common processing unit, and the packet received from the second network is input to the second common processing unit, when the power of the first common processing unit is on, and the power of the second common processing unit is off, the packets received from the first network and the second network are input to the first common processing unit, and when the power of the first common processing unit is off, and the power of the second common processing unit is on, the packets received from the first network and the second network are input to the second common processing unit, and controls the first individual processing switching unit and the second individual processing switching unit such that when the powers of the first common processing unit and the second common processing unit are on, the first common processing unit is connected to the first individual processing unit, and the second common processing unit is connected to the second individual processing unit, when the power of the first common processing unit is on, and the power of the second common processing unit is off, the first common processing unit is connected to the first individual processing unit and the second individual processing unit, and when the power of the first common processing unit is off, and the power of the second common processing unit is on, the second common processing unit is connected to the first individual processing unit and the second individual processing unit, and the output destination switching unit outputs the packet received from the first network to the second network and outputs the packet received from the second network to the first network.

(Supplementary Note 13) There is provided the packet transfer processing device according to supplementary note 12, wherein the first common processing unit comprises a first buffer that accumulates the packets input from the input destination switching unit, and a first logic processing unit that, when the power necessary for the operation of the first common processing unit is on, and the power of the second common processing unit is on, performs the first transfer processing in cooperation with the first individual processing unit for the packets accumulated in the first buffer, and when the power of the first common processing unit is on, and the power of the second common processing unit is off, performs the first transfer processing in cooperation with the first individual processing unit and the second transfer processing in cooperation with the second individual processing unit for the packets accumulated in the first buffer, the second common processing unit comprises a second buffer that accumulates the packets input from the input destination switching unit, and a second logic processing unit of, when the power necessary for the operation of the second common processing unit is on, and the power of the first common processing unit is on, performs the second transfer processing in cooperation with the second individual processing unit for the packets accumulated in the second buffer, and when the power of the second common processing unit is on, and the power of the first common processing unit is off, performs the first transfer processing in cooperation with the first individual processing unit and the second transfer processing in cooperation with the second individual processing unit for the packets accumulated in the second buffer, the control unit comprises a first queue length determination unit that compares an accumulation amount of the packets accumulated in the first buffer with a predetermined first threshold, a second queue length determination unit that compares an accumulation amount of the packets accumulated in the second buffer with a predetermined second threshold, and an adaptive control unit that performs, based on comparison results of the first queue length determination unit and the second queue length determination unit, control of the input destination switching unit, control of the first individual processing switching unit and the second individual processing switching unit, power on/off control of the first common processing unit and the second common processing unit, and common processing control of instructing the first individual processing unit and the second individual processing unit to permit or prohibit the first transfer processing and the second transfer processing, the first logic processing unit notifies the adaptive control unit of transfer completion when the powers of the first common processing unit and the second common processing unit are on, and the first transfer processing is completed, and notifies the adaptive control unit of transfer completion when the second transfer processing is completed after the power of the second common processing unit is switched from off to on, and the second logic processing unit notifies the adaptive control unit of transfer completion when the powers of the first common processing unit and the second common processing unit are on, and the second transfer processing is completed, and notifies the adaptive control unit of transfer completion when the first transfer processing is completed after the power of the first common processing unit is switched from off to on.

(Supplementary Note 14) There is provided the packet transfer processing device according to supplementary note 12, wherein the first common processing unit comprises a first buffer that accumulates the packets input from the input destination switching unit, and a first logic processing unit that, when the power necessary for the operation of the first common processing unit is on, and the power of the second common processing unit is on, performs the first transfer processing in cooperation with the first individual processing unit for the packets accumulated in the first buffer, and when the power of the first common processing unit is on, and the power of the second common processing unit is off, performs the first transfer processing in cooperation with the first individual processing unit and the second transfer processing in cooperation with the second individual processing unit for the packets accumulated in the first buffer, the second common processing unit comprises a second buffer that accumulates the packets input from the input destination switching unit, and a second logic processing unit of, when the power necessary for the operation of the second common processing unit is on, and the power of the first common processing unit is on, performs the second transfer processing in cooperation with the second individual processing unit for the packets accumulated in the second buffer, and when the power of the second common processing unit is on, and the power of the first common processing unit is off, performs the first transfer processing in cooperation with the first individual processing unit and the second transfer processing in cooperation with the second individual processing unit for the packets accumulated in the second buffer, the control unit comprises a first queue length determination unit that compares an accumulation amount of the packets accumulated in the first buffer with a predetermined first threshold, a second queue length determination unit that compares an accumulation amount of the packets accumulated in the second buffer with a predetermined second threshold, and an adaptive control unit that performs, based on comparison results of the first queue length determination unit and the second queue length determination unit, control of the input destination switching unit, control of the first individual processing switching unit and the second individual processing switching unit, and power on/off control of the first common processing unit and the second common processing unit, the first individual processing switching unit and the second individual processing switching unit have a function of sending a switching completion notification to the selected common processing unit out of the first common processing unit and the second common processing unit, the first logic processing unit executes the first transfer processing in cooperation with the first individual processing unit only during a period when the first common processing unit is selected by the first individual processing switching unit and notifies the adaptive control unit of transfer completion when the first transfer processing is completed, and executes the second transfer processing in cooperation with the second individual processing unit only during a period when the first common processing unit is selected by the second individual processing switching unit and notifies the adaptive control unit of transfer completion when the second transfer processing is completed, and the second logic processing unit executes the first transfer processing in cooperation with the first individual processing unit only during a period when the second common processing unit is selected by the first individual processing switching unit and notifies the adaptive control unit of transfer completion when the first transfer processing is completed, and executes the second transfer processing in cooperation with the second individual processing unit only during a period when the second common processing unit is selected by the second individual processing switching unit and notifies the adaptive control unit of transfer completion when the second transfer processing is completed.

INDUSTRIAL APPLICABILITY

The present invention is applicable to a router or a switch that concentrates an access network in a communication network and is connected to a core network.

EXPLANATION OF THE REFERENCE NUMERALS AND SIGNS 1, 1a, 1b, 1c, 1d, 1e . . . packet transfer processing device, 2, 2a, 2b, 2c, 2d, 2e . . . common processing unit, 3, 3a, 3b, 3c, 3d, 3e . . . common processing unit, 4, 4a, 4b, 4c, 4d, 4e . . . control unit, 5 . . . input destination switching unit, 6 . . . output destination switching unit, 7, 7b . . . individual processing switching unit, 7c, 7d, 7e . . . individual processing switching unit, 8c, 8d, 8e . . . individual processing switching unit, 10, 11 . . . individual processing unit, 12 . . . reception terminal, 13 . . . reception terminal, 14 . . . transmission terminal, 15 . . . transmission terminal, 20, 20b, 20d, 20e . . . logic processing unit, 21 . . . buffer, 22 . . . power-on/off unit, 22d . . . power-on/off unit, 30, 30b, 30d, 30e . . . logic processing unit, 31 . . . buffer, 32d . . . power-on/off unit, 40 . . . queue length monitoring unit, 41 . . . queue length monitoring unit, 42 . . . queue length determination unit, 43 . . . queue length determination unit, 44, 44b, 44d, 44e . . . adaptive control unit

The invention claimed is:

1. A packet transfer processing method comprising:
an input destination switching step of selecting one of a plurality of common processing units, that perform processing common to first transfer processing for receiving a packet from a first network and transferring the packet to a second network and second transfer processing for receiving a packet from the second network and transferring the packet to the first network, to which the packets received from the first network and the second network are to be input;
a common processing step of causing the plurality of common processing units to perform the processing common to the first transfer processing and the second transfer processing;
an output destination switching step of outputting packets processed in the common processing step to a network of a transfer destination;
an individual processing switching step of selecting which common processing unit is to be connected to at least one individual processing unit that performs at least one of first individual processing as part of the first transfer processing not executed by the plurality of common processing units and second individual processing as part of the second transfer processing not executed by the plurality of common processing units; and
a control step of performing selection control in the input destination switching step, selection control in the individual processing switching step, and control of switching supply/shutoff of power to the plurality of common processing units.

2. The packet transfer processing method according to claim 1, wherein the plurality of common processing units comprises two common processing units, and the common processing step comprises:
a first common processing step of, when power necessary for an operation of a first common processing unit of the two common processing units is on, causing the first common processing unit to perform the first transfer processing in cooperation with a first individual processing unit which performs the first individual processing; and
a second common processing step of, when the power of the first common processing unit is on,
causing a second common processing unit of the two common processing units to perform the second transfer processing in cooperation with a second individual processing unit which performs the second individual processing and, when the power of the first common processing unit is off, causing the second common processing unit to perform the first transfer processing in cooperation with the first individual processing unit and the second transfer processing in cooperation with the second individual processing unit, the control step comprises the steps of:
turning on the power of the first common processing unit when causing the first common processing unit to perform the first transfer processing and causing the second common processing unit to perform the second transfer processing, and turning off the power of the first common processing unit when causing the second common processing unit to perform both the first transfer processing and the second transfer processing;
controlling the selection in the input destination switching step such that when the power of the first common processing unit is on, the packet received from the first network is input to the first common processing unit, and the packet received from the second network is input to the second common processing unit, and when the power of the first common processing unit is off, the packets received from the first network and the second network respectively are input to the second common processing unit; and
controlling the selection in the individual processing switching step such that when the power of the first common processing unit is on, the first common processing unit is connected to the first individual processing unit, and when the power of the first common processing unit is off, the second common processing unit is connected to the first individual processing unit, and
the output destination switching step comprises the step of outputting the packet received from the first network to the second network and outputting the packet received from the second network to the first network.

3. The packet transfer processing method according to claim 2, wherein
the first common processing step comprises a first logic processing step of, when the power of the first common processing unit is on, performing the first transfer processing in cooperation with the first individual processing unit for packets accumulated in a first buffer in the first common processing unit,
the second common processing step comprises a second logic processing step of, when the power of the first common processing unit is on, performing the second transfer processing in cooperation with the second individual processing unit for packets accumulated in a second buffer in the second common processing unit, and when the power of the first common processing unit is off, performing the first transfer processing in cooperation with the first individual processing unit and the second transfer processing in cooperation with the second individual processing unit for the packets accumulated in the second buffer,
the control step comprises:
a first queue length determination step of comparing an accumulation amount of the packets accumulated in the first buffer with a predetermined first threshold;
a second queue length determination step of comparing an accumulation amount of the packets accumulated in the second buffer with a predetermined second threshold; and
an adaptive control step of performing, based on comparison results in the first queue length determination step and the second queue length determination step, selection control in the input destination switching step, selection control in the individual processing switching step, power on/off control of the first common processing unit, and common processing control of instructing one of permission and prohibition of the first transfer processing in the first logic processing step and the second logic processing step, and wherein the first logic processing step and the second logic processing step each further comprise a step of notifying an adaptive control unit that performs the adaptive control step of transfer completion when the first transfer processing is completed.

4. The packet transfer processing method according to claim 2, wherein the first common processing step comprises a first logic processing step of, when the power of the first common processing unit is on, performing the first transfer processing in cooperation with the first individual processing unit for packets accumulated in a first buffer in the first common processing unit, the second common processing step comprises a second logic processing step of, when the power of the first common processing unit is on, performing the second transfer processing in cooperation with the second individual processing unit for packets accumulated in a second buffer in the second common processing unit, and when the power of the first common processing unit is off, performing the first transfer processing in cooperation with the first individual processing unit and the second transfer processing in cooperation with the second individual processing unit for the packets accumulated in the second buffer, the control step comprises:

a first queue length determination step of comparing an accumulation amount of the packets accumulated in the first buffer with a predetermined first threshold;

a second queue length determination step of comparing an accumulation amount of the packets accumulated in the second buffer with a predetermined second threshold; and an adaptive control step of performing, based on comparison results in the first queue length determination step and the second queue length determination step, selection control in the input destination switching step, selection control in the individual processing switching step, and power on/off control of the first common processing unit, the individual processing switching step comprises a step of sending a switching completion notification to the selected common processing unit of the first common processing unit and the second common processing unit, and the first logic processing step comprises the steps of executing the first transfer processing in cooperation with the first individual processing unit only during a period when the first common processing unit is selected in the individual processing switching step and notifying an adaptive control unit that performs the selection control in the individual processing switching step of transfer completion when the first transfer processing is completed, and the second logic processing step comprises the step of executing the first transfer processing in cooperation with the first individual processing unit only during a period when the second common processing unit is selected in the individual processing switching step and notifying the adaptive control unit of transfer completion when the first transfer processing is completed.

5. The packet transfer processing method according to claim 1, wherein the plurality of common processing units comprises two common processing units, and the individual processing switching step comprises:

a first individual processing switching step of connecting a first individual processing unit that performs the first individual processing to one of the plurality of common processing units; and a second individual processing switching step of connecting a second individual processing unit that performs the second individual processing to one of the plurality of common processing units, the common processing step comprises:

a first common processing step of, when power necessary for an operation of a first common processing unit of the two common processing units is on, causing the first common processing unit to perform the first transfer processing in cooperation with the first individual processing unit and when the power of the first common processing unit is on and the power of a second common processing unit out of the two common processing units is off, perform the first transfer processing in cooperation with the first individual processing unit and the second transfer processing in cooperation with the second individual processing unit; and a second common processing step of, when the power necessary for the operation of the second common processing unit is on, causing the second common processing unit to perform the second transfer processing in cooperation with the second individual processing unit, and, when the power of the second common processing unit is on, and the power of the first common processing unit is off, perform the first transfer processing in cooperation with the first individual processing unit and the second transfer processing in cooperation with the second individual processing unit, the control step comprises the steps of:

turning on the powers of the first common processing unit and the second common processing unit when causing the first common processing unit to perform the first transfer processing and causing the second common processing unit to perform the second transfer processing, turning on the power of the first common processing unit and turning off the power of the second common processing unit when causing the first common processing unit to perform both the first transfer processing and the second transfer processing, and turning on the power of the second common processing unit and turning off the power of the first common processing unit when causing the second common processing unit to perform both the first transfer processing and the second transfer processing;

controlling selection in the input destination switching step such that when the powers of the first common processing unit and the second common processing unit are on, the packet received from the first network is input to the first common processing unit, and the packet received from the second network is input to the second common processing unit, when the power of the first common processing unit is on, and the power of the second common processing unit is off, the packets received from the first network and the second network are input to the first common processing unit, and when the power of the first common processing unit is off, and the power of the second common processing unit is on, the packets received from the first network and the second network are input to the second common processing unit; and controlling selection in the first individual processing switching step and the second individual processing switching step such that when the powers of the first common processing unit and the second common processing unit are on, the first common processing unit is connected to the first individual processing unit, and the second common processing unit is connected to the second individual processing unit, when the power of the first common processing unit is on, and the power of the second common processing unit is off, the first common processing unit is connected to the first individual processing unit and the second individual processing unit, and when the power of the first common processing unit is off, and the power of the second common processing unit is on, the second common processing unit is connected to the first individual processing unit and the second individual processing unit, and the output destination switching step comprises the step of outputting the packet received from the first network to the second network and outputting the packet received from the second network to the first network.

6. The packet transfer processing method according to claim 5, wherein the first common processing step comprises a first logic processing step of, when the power of the first common processing unit is on, and the power of the second common processing unit is on, performing the first transfer processing in cooperation with the first individual processing unit for packets accumulated in a first buffer in the first common processing unit, and when the power of the first common processing unit is on, and the power of the second common processing unit is off, performing the first transfer processing in cooperation with the first individual processing unit and the second transfer processing in cooperation with the second individual processing unit for the packets accumulated in the first buffer, the second common processing step comprises a second logic processing step of, when the power of the second common processing unit is on, and the power of the first common processing unit is on, performing the second transfer processing in cooperation with the second individual processing unit for packets accumulated in a second buffer in the second common processing unit, and when the power of the second common processing unit is on, and the power of the first common processing unit is off, performing the first transfer processing in cooperation with the first individual processing unit and the second transfer processing in cooperation with the second individual processing unit for the packets accumulated in the second buffer, the control step comprises:

a first queue length determination step of comparing an accumulation amount of the packets accumulated in the first buffer with a predetermined first threshold;

a second queue length determination step of comparing an accumulation amount of the packets accumulated in the second buffer with a predetermined second threshold; and an adaptive control step of performing, based on comparison results in the first queue length determination step and the second queue length determination step, selection control in the input destination switching step, selection control in the first individual processing switching step and the second individual processing switching step, power on/off control of the first common processing unit and the second common processing unit, and common processing control of instructing one of permission and prohibition of the first transfer processing and the second transfer processing in the first logic processing step and the second logic processing step, the first logic processing step comprises the step of notifying an adaptive control unit that performs the adaptive control step of transfer completion when the powers of the first common processing unit and the second common processing unit are on, and the first transfer processing is completed, and notifying the adaptive control unit of transfer completion when the second transfer processing is completed after the power of the second common processing unit is switched from off to on, and the second logic processing step comprises the step of notifying the adaptive control unit of transfer completion when the powers of the first common processing unit and the second common processing unit are on, and the second transfer processing is completed, and notifying the adaptive control unit of transfer completion when the first transfer processing is completed after the power of the first common processing unit is switched from off to on.

7. The packet transfer processing method according to claim 5, wherein the first common processing step comprises a first logic processing step of, when the power of the first common processing unit is on, and the power of the second common processing unit is on, performing the first transfer processing in cooperation with the first individual processing unit for packets accumulated in a first buffer in the first common processing unit, and when the power of the first common processing unit is on, and the power of the second common processing unit is off, performing the first transfer processing in cooperation with the first individual processing unit and the second transfer processing in cooperation with the second individual processing unit for the packets accumulated in the first buffer, the second common processing step comprises a second logic processing step of, when the power of the second common processing unit is on, and the power of the first common processing unit is on, performing the second transfer processing in cooperation with the second individual processing unit for packets accumulated in a second buffer in the second common processing unit, and when the power of the second common processing unit is on, and the power of the first common processing unit is off, performing the first transfer processing in cooperation with the first individual processing unit and the second transfer processing in cooperation with the second individual processing unit for the packets accumulated in the second buffer, the control step comprises:

a first queue length determination step of comparing an accumulation amount of the packets accumulated in the first buffer with a predetermined first threshold;

a second queue length determination step of comparing an accumulation amount of the packets accumulated in the second buffer with a predetermined second threshold; and an adaptive control step of performing, based on comparison results in the first queue length determination step and the second queue length determination step, selection control in the input destination switching step, selection control in the first individual processing switching step and the second individual processing switching step, and power on/off control of the first common processing unit and the second common processing unit, the first individual processing switching step and the second individual processing switching step each further comprise the step of sending a switching completion notification to the selected common processing unit out of the first common processing unit and the second common processing unit, the first logic processing step comprises the steps of executing the first transfer processing in cooperation with the first individual processing unit only during a period when the first common processing unit is selected in the first individual processing switching step and notifying an adaptive control unit that controls selection in the first individual processing switching step and the second individual processing switching step of transfer completion when the first transfer processing is completed, and executing the second transfer processing in cooperation with the second individual processing unit only during a period when the first common processing unit is selected in the second individual processing switching step and notifying the adaptive control unit of transfer completion when the second transfer processing is completed, and the second logic processing step comprises the steps of executing the first transfer processing in cooperation with the first individual processing unit only during a period when the second common processing unit is selected in the first individual processing switching step and notifying the adaptive control unit of transfer completion when the first transfer processing is completed, and executing the second transfer processing in cooperation with the second individual processing unit only during a period when the second common processing unit is selected in the second individual processing switching step and notifying the adaptive control unit of transfer completion when the second transfer processing is completed.

8. The packet transfer processing method according to any one of claims 1 to 7, wherein
the first network comprises an access network, and
the second network comprises a core network.

9. A packet transfer processing device comprising:
a plurality of common processing units that perform processing common to first transfer processing for receiving a packet from a first network and transferring the packet to a second network and second transfer processing for receiving a packet from the second network and transferring the packet to the first network;
an input destination switching unit that selects a common processing unit to which packets received from the first network and the second network are to be input;
an output destination switching unit that outputs packets processed by the plurality of common processing units to a network of a transfer destination;
an individual processing switching unit that selects which common processing unit is to be connected to an individual processing unit of a plurality of individual processing units that performs at least one of first individual processing as part of the first transfer processing not executed by the plurality of common processing units and second individual processing as part of the second transfer processing not executed by the plurality of common processing units; and
a control unit that performs control of the input destination switching unit, control of the individual processing switching unit, and control of switching supply/shutoff of power to the plurality of common processing units.

10. The packet transfer processing device according to claim 9, wherein
the plurality of common processing units comprises two common processing units,
a first common processing unit out of the two common processing units performs the first transfer processing in cooperation with a first individual processing unit which performs the first individual processing via the individual processing switching unit when power necessary for an operation of the first common processing unit is on,
a second common processing unit out of the two common processing units performs the second transfer processing in cooperation with a second individual processing unit which performs the second individual processing when the power of the first common processing unit is on and performs the first transfer processing in cooperation with the first individual processing unit and the second transfer processing in cooperation with the second individual processing unit via the individual processing switching unit when the power of the first common processing unit is off,
the control unit turns on the power of the first common processing unit when causing the first common processing unit to perform the first transfer processing and causing the second common processing unit to perform the second transfer processing, turns off the power of the first common processing unit when causing the second common processing unit to perform both the first transfer processing and the second transfer processing, controls the input destination switching unit such that when the power of the first common processing unit is on, the packet received from the first network is input to the first common processing unit, and the packet received from the second network is input to the second common processing unit, and when the power of the first common processing unit is off, the packets received from the first network and the second network are input to the second common processing unit, and controls the individual processing switching unit such that when the power of the first common processing unit is on, the first common processing unit is connected to the first individual processing unit, and when the power of the first common processing unit is off, the second common processing unit is connected to the first individual processing unit, and
the output destination switching unit outputs the packet received from the first network to the second network and outputs the packet received from the second network to the first network.

11. The packet transfer processing device according to claim 10, wherein
the first common processing unit comprises a first buffer that accumulates packets input from the input destination switching unit, and a first logic processing unit that, when the power necessary for the operation of the first common processing unit is on, performs the first transfer processing in cooperation with the first individual processing unit for the packets accumulated in the first buffer,
the second common processing unit comprises a second buffer that accumulates packets input from the input destination switching unit, and a second logic processing unit that, when the power of the first common processing unit is on, performs the second transfer processing in cooperation with the second individual processing unit for the packets accumulated in the second buffer, and when the power of the first common processing unit is off, performs the first transfer processing in cooperation with the first individual processing unit and the second transfer processing in cooperation with the second individual processing unit for the packets accumulated in the second buffer, the control unit comprises a first queue length determination unit that compares an accumulation amount of the packets accumulated in the first buffer with a predetermined first threshold, a second queue length determination unit that compares an accumulation amount of the packets accumulated in the second buffer with a predetermined second threshold, and an adaptive control unit that performs, based on comparison results of the first queue length determination unit and the second queue length determination unit, control of the input destination switching unit, control of the individual processing switching unit, power on/off control of the first common processing unit, and common processing control of instructing the first logic processing unit and the second logic processing unit to permit or prohibit the first transfer processing, and the first logic processing unit and the second logic processing unit each notify the adaptive control unit of transfer completion when the first transfer processing is completed.

12. The packet transfer processing device according to claim 10, wherein the first common processing unit comprises a first buffer that accumulates packets input from the input destination switching unit, and a first logic processing unit that, when the power necessary for the operation of the first common processing unit is on, performs the first transfer processing in cooperation with the first individual processing unit for the packets accumulated in the first buffer, the second common processing unit comprises a second buffer that accumulates packets input from the input destination switching unit, and a second logic processing unit that, when the power of the first common processing unit is on, performs the second transfer processing in cooperation with the second individual processing unit for the packets accumulated in the second buffer, and when the power of the first common processing unit is off, performs the first transfer processing in cooperation with the first individual processing unit and the second transfer processing in cooperation with the second individual processing unit for the packets accumulated in the second buffer, the control unit comprises a first queue length determination unit that compares an accumulation amount of the packets accumulated in the first buffer with a predetermined first threshold, a second queue length determination unit that compares an accumulation amount of the packets accumulated in the second buffer with a predetermined second threshold, and an adaptive control unit that performs, based on comparison results of the first queue length determination unit and the second queue length determination unit, control of the input destination switching unit, control of the individual processing switching unit, and power on/off control of the first common processing unit, the individual processing switching unit has a function of sending a switching completion notification to the selected common processing unit of the first common processing unit and the second common processing unit, the first logic processing unit executes the first transfer processing in cooperation with the first individual processing unit only during a period when the first common processing unit and the second common processing unit is selected by the individual processing switching unit and notifies, the adaptive control unit of transfer completion when the first transfer processing is completed, and the second logic processing unit executes the first transfer processing in cooperation with the first individual processing unit only during a period when the second common processing unit is selected by the individual processing switching unit notifies the adaptive control unit of transfer completion when the first transfer processing is completed.

13. The packet transfer processing device according to claim 9, wherein the plurality of common processing units comprises two common processing units, the individual processing switching unit comprises two individual processing switching units including a first individual processing switching unit that connects a first individual processing unit that performs the first individual processing to one of the plurality of common processing units and a second individual processing switching unit that connects a second individual processing unit that performs the second individual processing to one of the plurality of common processing units, a first common processing unit out of the two common processing units performs the first transfer processing in cooperation with the first individual processing unit via the first individual processing switching unit when power necessary for an operation of the first common processing unit is on, and performs the first transfer processing in cooperation with the first individual processing unit via the first individual processing switching unit and the second transfer processing in cooperation with the second individual processing unit via the second individual processing switching unit when the power of the first common processing unit is on, and the power of a second common processing unit out of the two common processing units is off, the second common processing unit out of the two common processing units performs the second transfer processing in cooperation with the second individual processing unit via the second individual processing switching unit when the power necessary for the operation of the second common processing unit is on, and performs the first transfer processing in cooperation with the first individual processing unit via the first individual processing switching unit and the second transfer processing in cooperation with the second individual processing unit via the second individual processing switching unit when the power of the second common processing unit is on, and the power of the first common processing unit is off, the control unit turns on the powers of the first common processing unit and the second common processing unit when causing the first common processing unit to perform the first transfer processing and causing the second common processing unit to perform the second transfer processing, turns on the power of the first common processing unit and turns off the power of the second common processing unit when causing the first common processing unit to perform both the first transfer processing and the second transfer processing, and turns on the power of the second common processing unit and turns off the power of the first common processing unit when causing the second common processing unit to perform both the first transfer processing and the second transfer processing, controls the input destination switching unit such that when the powers of the first common processing unit and the second common processing unit are on, the packet received from the first network is input to the first common processing unit, and the packet received from the second network is input to the second common processing unit, when the power of the first common processing unit is on, and the power of the second common processing unit is off, the packets received from the first network and the second network are input to the first common processing unit, and when the power of the first common processing unit is off, and the power of the second common processing unit is on, the packets received from the first network and the second network are input to the second common processing unit, and controls the first individual processing switching unit and the second individual processing switching unit such that when the powers of the first common processing unit and the second common processing unit are on, the first common processing unit is connected to the first individual processing unit, and the second common processing unit is connected to the second individual processing unit, when the power of the first common processing unit is on, and the power of the second common processing unit is off, the first common processing unit is connected to the first individual processing unit and the second individual processing unit, and when the power of the first common processing unit is off, and the power of the second common processing unit is on, the second common processing unit is connected to the first individual processing unit and the second individual processing unit, and the output destination switching unit outputs the packet received from the first network to the second network and outputs the packet received from the second network to the first network.

14. The packet transfer processing device according to claim 13, wherein the first common processing unit comprises a first buffer that accumulates packets input from the input destination switching unit, and a first logic processing unit that, when the power necessary for the operation of the first common processing unit is on, and the power of the second common processing unit is on, performs the first transfer processing in cooperation with the first individual processing unit for the packets accumulated in the first buffer, and when the power of the first common processing unit is on, and the power of the second common processing unit is off, performs the first transfer processing in cooperation with the first individual processing unit and the second transfer processing in cooperation with the second individual processing unit for the packets accumulated in the first buffer, the second common processing unit comprises a second buffer that accumulates packets input from the input destination switching unit, and a second logic processing unit which, when the power necessary for the operation of the second common processing unit is on, and the power of the first common processing unit is on, performs the second transfer processing in cooperation with the second individual processing unit for the packets accumulated in the second buffer, and when the power of the second common processing unit is on, and the power of the first common processing unit is off, performs the first transfer processing in cooperation with the first individual processing unit and the second transfer processing in cooperation with the second individual processing unit for the packets accumulated in the second buffer, the control unit comprises a first queue length determination unit that compares an accumulation amount of the packets accumulated in the first buffer with a predetermined first threshold, a second queue length determination unit that compares an accumulation amount of the packets accumulated in the second buffer with a predetermined second threshold, and an adaptive control unit that performs, based on comparison results of the first queue length determination unit and the second queue length determination unit, control of the input destination switching unit, control of the first individual processing switching unit and the second individual processing switching unit, power on/off control of the first common processing unit and the second common processing unit, and common processing control of instructing the first individual processing unit and the second individual processing unit to permit or prohibit the first transfer processing and the second transfer processing, the first logic processing unit notifies the adaptive control unit of transfer completion when the powers of the first common processing unit and the second common processing unit are on, and the first transfer processing is completed, and notifies the adaptive control unit of transfer completion when the second transfer processing is completed after the power of the second common processing unit is switched from off to on, and the second logic processing unit notifies the adaptive control unit of transfer completion when the powers of the first common processing unit and the second common processing unit are on, and the second transfer processing is completed, and notifies the adaptive control unit of transfer completion when the first transfer processing is completed after the power of the first common processing unit is switched from off to on.

15. The packet transfer processing device according to claim 13, wherein the first common processing unit comprises a first buffer that accumulates packets input from the input destination switching unit, and a first logic processing unit that, when the power necessary for the operation of the first common processing unit is on, and the power of the second common processing unit is on, performs the first transfer processing in cooperation with the first individual processing unit for the packets accumulated in the first buffer, and when the power of the first common processing unit is on, and the power of the second common processing unit is off, performs the first transfer processing in cooperation with the first individual processing unit and the second transfer processing in cooperation with the second individual processing unit for the packets accumulated in the first buffer, the second common processing unit comprises a second buffer that accumulates packets input from the input destination switching unit, and a second logic processing unit of, when the power necessary for the operation of the second common processing unit is on, and the power of the first common processing unit is on, performs the second transfer processing in cooperation with the second individual processing unit for the packets accumulated in the second buffer, and when the power of the second common processing unit is on, and the power of the first common processing unit is off, performs the first transfer processing in cooperation with the first individual processing unit and the second transfer processing in cooperation with the second individual processing unit for the packets accumulated in the second buffer, the control unit comprises a first queue length determination unit that compares an accumulation amount of the packets accumulated in the first buffer with a predetermined first threshold, a second queue length determination unit that compares an accumulation amount of the packets accumulated in the second buffer with a predetermined second threshold, and an adaptive control unit that performs, based on comparison results of the first queue length determination unit and the second queue length determination unit, control of the input destination switching unit, control of the first individual processing switching unit and the second individual processing switching unit, and power on/off control of the first common processing unit and the second common processing unit, the first individual processing switching unit and the second individual processing switching unit have a function of sending a switching completion notification to the selected common processing unit out of the first common processing unit and the second common processing unit, the first logic processing unit executes the first transfer processing in cooperation with the first individual processing unit only during a period when the first common processing unit and the second common processing unit are selected by the first individual processing switching unit and notifies the adaptive control unit of transfer completion when the first transfer processing is completed, and executes the second transfer processing in cooperation with the second individual processing unit only during a period when the first common processing unit is selected by the second individual processing switching unit and notifies the adaptive control unit of transfer completion when the second transfer processing is completed, and the second logic processing unit executes the first transfer processing in cooperation with the first individual processing unit only during a period when the second common processing unit is selected by the first individual processing switching unit and notifies the adaptive control unit of transfer completion when the first transfer processing is completed, and executes the second transfer processing in cooperation with the second individual processing unit only during a period when the second common processing unit is selected by the second individual processing switching unit and notifies the adaptive control unit of transfer completion when the second transfer processing is completed.

16. The packet transfer processing device according to any one of claims 9 to 15, wherein the first network comprises an access network, and the second network comprises a core network.

* * * * *